US012577813B2

(12) United States Patent
Taurasi et al.

(10) Patent No.: US 12,577,813 B2
(45) Date of Patent: Mar. 17, 2026

(54) CLOSURE LATCH ASSEMBLY WITH SINGLE MOTOR ACTUATOR CONFIGURED TO CONTROL MULTIPLE LATCH FUNCTIONS

(71) Applicant: MAGNA CLOSURES INC., Newmarket (CA)

(72) Inventors: Marco Taurasi, Leghorn (IT); Francesco Cumbo, Pisa (IT)

(73) Assignee: MAGNA CLOSURES INC., Newmarket (CA)

( * ) Notice: Subject to any disclaimer, the term of this patent is extended or adjusted under 35 U.S.C. 154(b) by 286 days.

(21) Appl. No.: 18/296,289

(22) Filed: Apr. 5, 2023

(65) Prior Publication Data

US 2023/0358080 A1 Nov. 9, 2023

Related U.S. Application Data

(60) Provisional application No. 63/337,961, filed on May 3, 2022.

(51) Int. Cl.

| | |
|---|---|
| ***E05B 77/26*** | (2014.01) |
| ***E05B 77/24*** | (2014.01) |
| ***E05B 81/06*** | (2014.01) |
| ***E05B 81/14*** | (2014.01) |
| ***E05B 81/30*** | (2014.01) |
| ***E05B 81/34*** | (2014.01) |

(52) U.S. Cl.
CPC ............ *E05B 77/26* (2013.01); *E05B 77/245* (2013.01); *E05B 81/06* (2013.01); *E05B 81/14* (2013.01); *E05B 81/15* (2013.01); *E05B 81/30* (2013.01); *E05B 81/34* (2013.01)

(58) Field of Classification Search
CPC ........ E05B 77/22; E05B 77/24; E05B 77/245; E05B 77/26; E05B 77/28; E05B 77/287; E05B 77/30; E05B 81/00; E05B 81/04; E05B 81/06; E05B 81/14; E05B 81/16; E05B 81/30; E05B 81/34; E05B 81/56
See application file for complete search history.

(56) References Cited

U.S. PATENT DOCUMENTS 6,062,613 A * 5/2000 Jung ........................ E05B 81/82 292/216
6,520,550 B2 * 2/2003 Kunst ..................... E05B 77/24 292/216

(Continued)

FOREIGN PATENT DOCUMENTS

DE 19742798 A1 * 1/1999 ............. E05B 77/26
EP 1212501 B1 11/2004

(Continued)

OTHER PUBLICATIONS

Espacenet machine translation of DE 19742798 A1, generated Mar. 8, 2025. (Year: 2025).*

*Primary Examiner* — Kristina R Fulton
*Assistant Examiner* — Emily G. Brown
(74) *Attorney, Agent, or Firm* — Dickinson Wright PLLC

(57) ABSTRACT

A power latch assembly for motor vehicle closure applications has a single motor operable to move a pawl from a ratchet holding position to a ratchet releasing position; place the power latch assembly in a double pull mechanical release state, and place the power latch assembly in a child lock state.

6 Claims, 34 Drawing Sheets

(56) References Cited

U.S. PATENT DOCUMENTS

| | | | | |
|---|---|---|---|---|
| 8,029,028 | B2 * | 10/2011 | Akizuki | E05B 77/28 292/216 |
| 8,474,888 | B2 * | 7/2013 | Tomaszewski | E05B 77/30 292/216 |
| 10,450,780 | B2 | 10/2019 | Tomaszewski | |
| 10,683,682 | B2 | 6/2020 | Taurasi et al. | |
| 10,711,492 | B2 * | 7/2020 | Cumbo | E05B 81/70 |
| 10,890,018 | B2 | 1/2021 | Distefano et al. | |
| 11,072,950 | B2 | 7/2021 | Taurasi | |
| 2002/0121784 | A1 * | 9/2002 | Chevalier | E05B 81/64 292/201 |
| 2004/0174021 | A1 | 9/2004 | Tensing et al. | |
| 2006/0290143 | A1 * | 12/2006 | Watanabe | E05B 81/16 292/216 |
| 2010/0117379 | A1 * | 5/2010 | Mitchell | E05B 85/02 292/201 |
| 2017/0089103 | A1 | 3/2017 | Ottino et al. | |
| 2017/0314297 | A1 | 11/2017 | Taurasi et al. | |
| 2017/0314298 | A1 * | 11/2017 | Tomaszewski | E05B 77/26 |
| 2017/0342749 | A1 * | 11/2017 | Nelson | E05B 85/243 |
| 2018/0016821 | A1 * | 1/2018 | Cumbo | E05B 81/70 |
| 2020/0102771 | A1 * | 4/2020 | Ney | E05B 77/30 |
| 2020/0340277 | A1 | 10/2020 | Robert | |
| 2022/0268064 | A1 | 8/2022 | Taurasi | |
| 2022/0298835 | A1 | 9/2022 | Taurasi et al. | |

FOREIGN PATENT DOCUMENTS

| | | | |
|---|---|---|---|
| EP | 1869274 | B1 | 12/2007 |
| EP | 2820214 | B1 | 4/2018 |
| WO | 2009030046 | A1 | 3/2009 |
| WO | 2013170363 | A1 | 11/2013 |

* cited by examiner

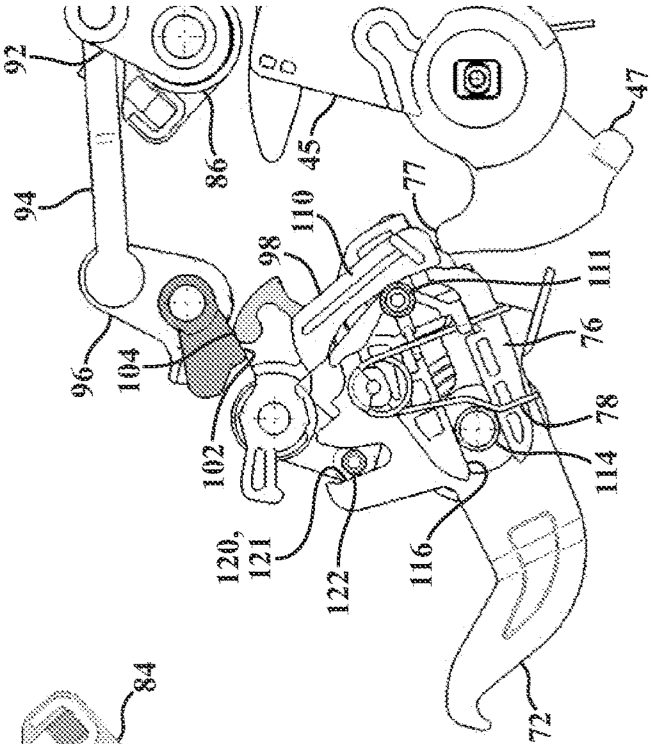
FIG. 14B
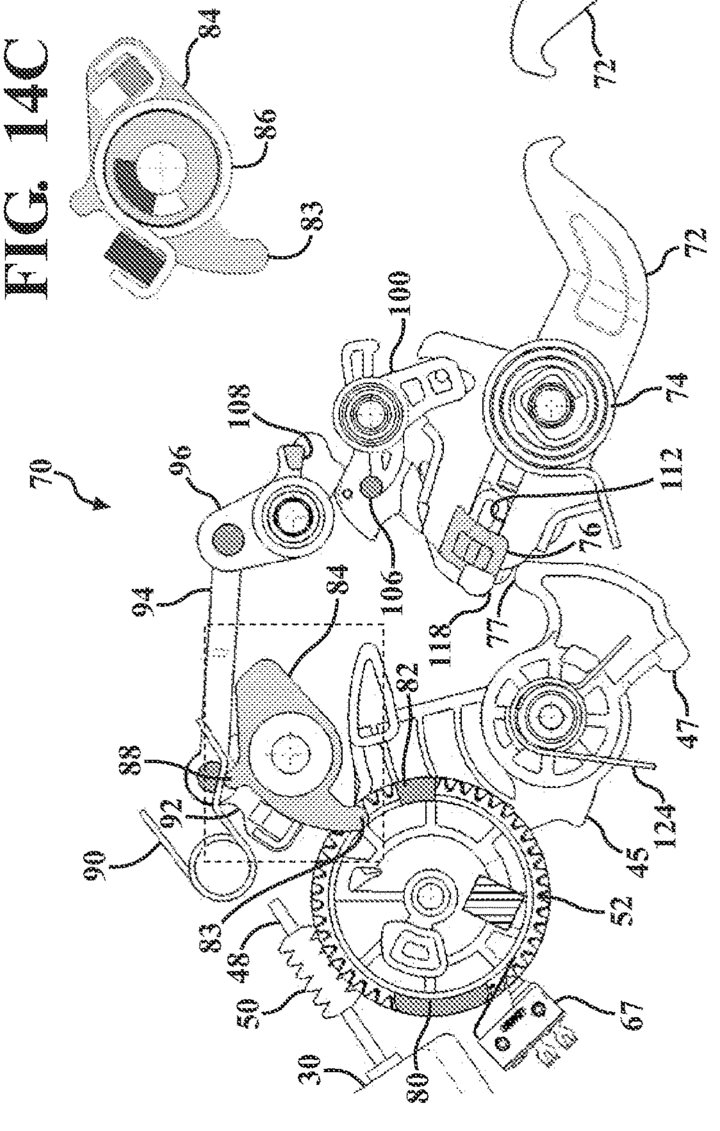
FIG. 14C
FIG. 14A

CLOSURE LATCH ASSEMBLY WITH SINGLE MOTOR ACTUATOR CONFIGURED TO CONTROL MULTIPLE LATCH FUNCTIONS

CROSS-REFERENCE TO RELATED APPLICATIONS

This application claims the benefit of U.S. Provisional Application Ser. No. 63/337,961, filed May 3, 2022, which is incorporated herein by reference in its entirety.

FIELD

The present disclosure relates generally to automotive door latches, and more particularly, to a power door latch assembly equipped with a power motor driving multiple functions, including power release, inside double pull release, and power child lock.

BACKGROUND

This section provides background information related to automotive door latches and is not necessarily prior art to the concepts associated with the present disclosure.

A vehicle closure panel, such as a side door for a vehicle passenger compartment, is hinged to swing between open and closed positions and includes a latch assembly mounted to the door. The latch assembly functions in a well-known manner to latch the door when it is closed and unlatch and release the door to permit subsequent movement of the door to its open position. As is also well known, the latch assembly is configured to include a latch mechanism for latching the door and a release mechanism for unlatching the door. The release mechanism can be power-operated to unlatch the door.

During powered actuation of latch mechanism, it is known to actuate a first gear mechanism with a first motor to move a pawl from a ratchet holding position to a ratchet releasing position, thereby allowing a ratchet to move from a striker capture position to a striker releasing position, whereat the door can be moved from a closed position to an open position.

Additionally, it is known to provide a secondary motor in addition to the first motor, with the secondary motor being used to, by way of example, move a lock mechanism to at least one of a double lock and a child lock position. Although such secondary motors can prove useful, they come at an increase in cost, complexity, power demand, and package size of the latch assembly.

Thus, there remains a need to develop alternative arrangements for latch mechanisms for use in vehicular door latches which optimize the ability to perform multiple functions without having to provide multiple motors to accomplish the desired functions.

SUMMARY

This section provides a general summary of the disclosure, and is not intended to be a comprehensive and exhaustive listing of all of its features or its full scope.

It is an object of the present disclosure to provide a power latch assembly for motor vehicle closure applications that overcomes at least those drawbacks discussed above associated with known power latch assemblies.

It is another object of the present disclosure to provide a power latch assembly for motor vehicle closure applications that has a single motor that is optimized in size and performs multiple functions.

It is another object of the present disclosure to provide a power latch assembly for motor vehicle closure applications that has a single motor capable of at least two or more functions, including: moving a pawl from a ratchet holding position to a ratchet releasing position; placing the power latch assembly in a double pull mechanical release state (double pull ON state), and placing the power latch assembly in a child lock state (child lock ON state).

In accordance with these and other objects, features and advantages, a power latch assembly for a closure panel includes: a ratchet configured for movement between a striker capture position and a striker release position and being biased toward the striker release position. Further, a pawl configured for movement between a ratchet holding position, whereat the pawl maintains the ratchet in the striker capture position, and a ratchet releasing position, whereat the pawl releases the ratchet for movement of the ratchet to the striker release position. A single power actuator is configured to move the pawl from the ratchet holding position to the ratchet releasing position. The single power actuator is further configured to selectively place the power latch assembly in a double pull lock state, whereat a double mechanical actuation of an inside release mechanism moves the pawl from the ratchet holding position to the ratchet releasing position. The single power actuator is further configured to place the power latch assembly in a child lock state, whereat repeated mechanical actuation of an inside release mechanism does not move the pawl from the ratchet holding position to the ratchet releasing position.

In accordance with another aspect of the disclosure, a power release gear is configured in operable communication with the single power actuator, wherein the single power actuator is configured to drive the power release gear from a home position, in a first direction, to a release position, whereupon the power release gear operably drives the pawl from the ratchet holding position to the ratchet releasing position, and from the home position, in a second direction, to a lock position, whereupon the power release gear operably places the power latch assembly in one of the double pull lock state and the child lock state.

In accordance with another aspect of the disclosure, the power release gear can be configured to move from the home position in the second direction to the lock position, whereupon the power release gear operably places the power latch assembly in the child lock state, and then be returned to directly to the home position, whereupon the power release gear operably places the power latch assembly in the double pull lock state.

In accordance with another aspect of the disclosure, a power latch assembly for a closure panel includes a ratchet configured for movement between a striker capture position and a striker release position, and being biased toward the striker release position. A pawl is configured for movement between a ratchet holding position, whereat the pawl maintains the ratchet in the striker capture position, and a ratchet releasing position, whereat the pawl releases the ratchet for movement of the ratchet to the striker release position. A single power actuator is configured to move the pawl from the ratchet holding position to the ratchet releasing position, to selectively place the power latch assembly in a double pull ON state, whereat a double mechanical actuation of an inside mechanical release mechanism moves the pawl from the ratchet holding position to the ratchet releasing position, and to place the power latch assembly in a child lock ON state, whereat mechanical actuation of the inside mechanical release mechanism does not move the pawl from the ratchet holding position to the ratchet releasing position.

In accordance with another aspect of the disclosure, a power release gear is configured in operable communication with the single power actuator, wherein the single power actuator is configured to drive the power release gear from a home position (HP) in a first direction to a release position (RP), whereupon the power release gear operably drives the pawl from the ratchet holding position to the ratchet releasing position, and from the home position in a second direction to a lock position (LP), whereupon the power release gear operably places the power latch assembly in the child lock ON state.

In accordance with another aspect of the disclosure, the single power actuator is configured to drive the power release gear in the first direction from the lock position back to the home position, whereupon the power release gear operably places the power latch assembly in the double pull ON state.

In accordance with another aspect of the disclosure, an actuator lever operably couples the power release gear to the pawl, whereat movement of the power release gear from the home position in the first direction to the release position causes the power release gear to drive the actuator lever from a rest position to a deployed position, whereat the pawl is driven from the ratchet holding position to the ratchet releasing position.

In accordance with another aspect of the disclosure, an inside release lever is provided, with the inside release lever having an inside lock link coupled thereto for movement relative to the inside release lever between a lock position, whereat the inside lock link is moved out from engagement with the actuator lever during mechanical actuation of the inside mechanical release mechanism, and an unlock position, whereat the inside lock link is moved for engagement with the actuator lever during mechanical actuation of the inside mechanical release mechanism, wherein the inside lock link is prevented from moving from the lock position to the unlock position while the power latch assembly is in the child lock ON state.

In accordance with another aspect of the disclosure, a lock link is provided to operably couple the power release gear to the inside lock link to cause movement of the inside lock link from the unlock position to the lock position in response to movement of the power release gear from the home position to the lock position.

In accordance with another aspect of the disclosure, a lock lug is fixed to the power release gear, the lock lug being configured prevent movement of the lock link while the power latch assembly is in the child lock ON state, thereby preventing movement of the inside lock link from the lock position to the unlock position.

In accordance with another aspect of the disclosure, a transmission sector operably couples the power release gear to the lock link. The transmission sector is configured to move from a home position to a deployed position under a force imparted by the lock lug as the power release gear moves from the home position to the lock position, whereupon the lock link is moved to cause the inside lock link to move from the unlock position to the lock position.

In accordance with another aspect of the disclosure, a toggle spring is configured for engagement with a detent of the transmission sector to releasably hold the transmission sector in a select one of the home position and the deployed position.

In accordance with another aspect of the disclosure, the transmission sector is blocked from moving from the deployed position to the home position by the lock lug when the power release gear is in the lock position, thereby maintaining the power latch assembly in the child lock ON state.

In accordance with another aspect of the disclosure, an inside lock lever operably couples the lock link to the inside lock link. The inside lock lever is configured to cause movement of the inside lock link from the unlock position to the lock position in response to movement of the power release gear from the home position to the lock position.

In accordance with another aspect of the disclosure, the inside lock lever is coupled directly to the lock link, and the inside lock lever is configured for direct engagement with the inside release lever and with the inside lock link.

In accordance with another aspect of the disclosure, a method of performing multiple functions with a single power actuator of a power latch assembly having a ratchet configured for movement between a striker capture position and a striker release position, and being biased toward the striker release position, and a pawl configured for movement between a ratchet holding position, whereat the pawl maintains the ratchet in the striker capture position, and a ratchet releasing position, whereat the pawl releases the ratchet for movement of the ratchet to the striker release position, includes: configuring the single power actuator to move the pawl from the ratchet holding position to the ratchet releasing position when the power latch assembly is in a latch closed, unlocked position; configuring the single power actuator to place the power latch assembly in a child lock ON state, whereat repeated mechanical actuation of an inside release mechanism fails to move the pawl from the ratchet holding position to the ratchet releasing position; and configuring the single power actuator to place the power latch assembly in a double pull ON state, whereupon a first mechanical actuation of the inside release mechanism moves the power latch assembly from the double pull ON state to a double pull OFF state.

In accordance with another aspect of the disclosure, the method further includes arranging a power release gear in operable communication with the single power actuator and configuring the single power actuator to drive the power release gear from a home position, in a first direction, to a release position, whereupon the power release gear operably drives the pawl from the ratchet holding position to the ratchet releasing position, and from the home position, in a second direction, to a lock position, whereupon the power release gear operably places the power latch assembly in the child lock ON state.

In accordance with another aspect of the disclosure, the method can further include configuring the single power actuator to drive the power release gear from the lock position, in the first direction back to the home position, whereupon the power latch assembly is placed in the double pull ON state.

In accordance with another aspect of the disclosure, a method of performing multiple functions with a power latch assembly having a single power actuator, includes: moving a pawl from a ratchet holding position to a ratchet releasing position; placing the power latch assembly in a double pull ON state, whereat a double mechanical actuation of an inside release mechanism moves the pawl from the ratchet holding position to the ratchet releasing position; and placing the power latch assembly in a child lock ON state, whereat repeated mechanical actuation of an inside release mechanism does not cause the pawl to move from the ratchet holding position to the ratchet releasing position.

In accordance with another aspect of the disclosure, a method of performing multiple functions with a single power actuator of a power latch assembly having a ratchet configured for movement between a striker capture position and a striker release position and being biased toward the striker release position and a pawl configured for movement between a ratchet holding position, whereat the pawl maintains the ratchet in the striker capture position, and a ratchet releasing position, whereat the pawl releases the ratchet for movement of the ratchet to the striker release position, is provided. The method includes, configuring the single power actuator to move the pawl from the ratchet holding position to the ratchet releasing position when the power latch assembly is in a latch closed, unlocked position. Further, configuring the single power actuator to selectively place the power latch assembly in a double pull lock state, whereat completion of a first and second mechanical actuation of an inside release mechanism the pawl is moved from the ratchet holding position to the ratchet releasing position. Further yet, configuring the single power actuator to place the power latch assembly in a child lock state, whereat repeated mechanical actuation of the inside release mechanism fails to move the pawl from the ratchet holding position to the ratchet releasing position.

In accordance with another aspect of the disclosure, the method can further include arranging a power release gear in operable communication with the single power actuator and configuring the single power actuator to drive the power release gear from a home position, in a first direction, to a release position, whereupon the power release gear operably drives the pawl from the ratchet holding position to the ratchet releasing position, and from the home position, in a second direction, to a lock position, whereupon the power release gear operably places the power latch assembly in the child lock state, and configuring the single power actuator to drive the power release gear from the lock position, in the first direction back to the home position, whereupon the power latch assembly is placed in the double pull lock state.

In accordance with another aspect of the disclosure, a method of performing multiple functions with a power latch assembly having a single power actuator, the multiple functions comprising: energizing the single power actuator and causing a pawl to move from a ratchet holding position to a ratchet releasing position; energizing the single power actuator and causing the power latch assembly to be moved into a double pull ON state, whereat a double mechanical actuation of an inside release mechanism moves the pawl from the ratchet holding position to the ratchet releasing position; and energizing the single power actuator and causing the power latch assembly to be moved into a child lock ON state, whereat repeated mechanical actuation of an inside release mechanism does not cause the pawl to move from the ratchet holding position to the ratchet releasing position.

Further areas of applicability and functionality of the power latch assembly and single motor thereof will become apparent from the description provided herein. The description and specific examples in this summary are intended for purposes of illustration only and are not intended to limit the scope of the present disclosure.

BRIEF DESCRIPTION OF THE DRAWINGS

These and other aspects, features, and advantages of the present disclosure will be readily appreciated, as the same becomes better understood by reference to the following detailed description when considered in connection with the accompanying drawings wherein:

FIG. 14A is a view similar to FIG. 13A after release of the inside release lever of the actuation mechanism upon completing the second pull;

FIG. 14B is fragmentary rear plan view of FIG. 14A;

FIG. 14C is a view similar to FIG. 6C of the transmission sector, transmission spring and toggle spring while the power release gear is in the home position, with the actuation mechanism in the double pull off state and the child lock off state upon completion of the second pull;

Corresponding reference numerals are used throughout all of the drawings to indicate corresponding parts.

DETAILED DESCRIPTION OF EXAMPLE EMBODIMENTS

Figure 1:
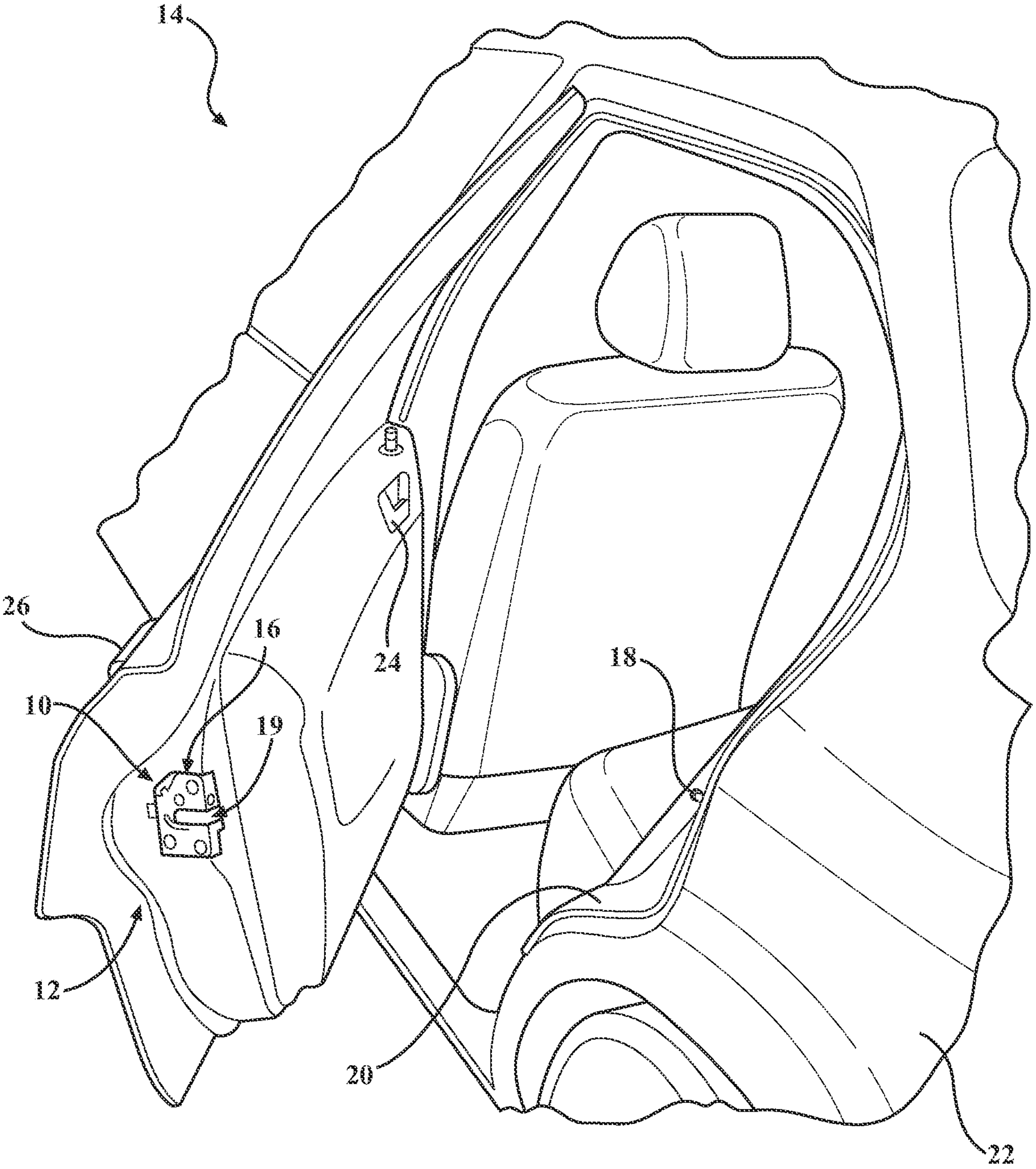
FIG. 1 is a partial perspective view of a motor vehicle having a side door equipped with a power latch assembly embodying the teachings of the present disclosure.

One or more example embodiments of a powered latch assembly of the type well-suited for use in motor vehicle closure systems will now be described with reference to the accompany drawings. However, these example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by a skilled artisan.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Figure 2:
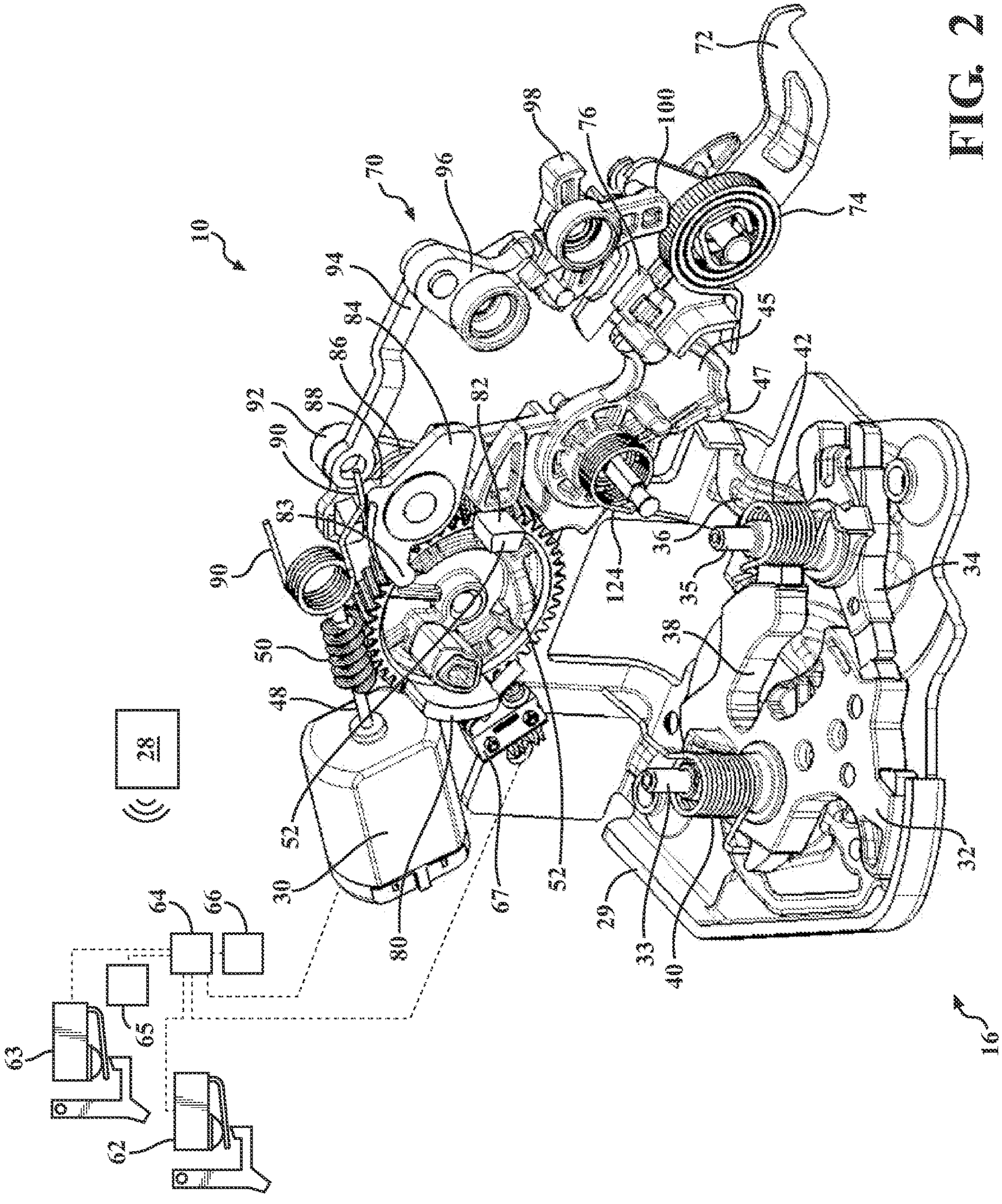
FIG. 2 is a front perspective view illustrating components of the power latch assembly of FIG. 1 embodying the teachings of the present disclosure shown schematically in operable communication with various components of the side door, with some components removed for clarity purposes only.

Referring initially to FIG. 1, a non-limiting example of a power latch assembly is shown, referred to hereafter simply as latch assembly 10, installed in a closure panel, such as, by way of example and without limitation, a door, shown as a passenger side swing door 12 of a motor vehicle 14. Latch assembly 10 includes a latch mechanism 16 configured to releasably latch and hold a striker 18 mounted to a sill portion 20 of a vehicle body 22 when swing door 12 is closed. Latch assembly 10 can be selectively actuated via mechanical actuation of an inside release mechanism, such as an inside door handle 24, an outside release mechanism, such as an outside door handle 26 and/or a key fob 28 (FIG. 2). As will be detailed, latch assembly 10 is configured to be power-operated to perform multiple functions, including, by way of example and without limitation, effecting a power release, effecting an inside double pull release (via a double pull of the inside release mechanism 24), and placing the latch assembly 10 in a power child lock position, via selective actuation of a single power release actuator, such as an electric motor 30. By multiple functions being powered via a single power release actuator 30, the latch assembly 10 is able to be manufactured in economical fashion, while also being minimized in size and weight, thereby enhancing the flexibility of design of the closure panel, while also reducing the cost associated therewith.

Referring to FIG. 2, shown is a non-limiting embodiment of latch assembly 10 and latch mechanism 16 contained in a housing, shown in part via a latch frame plate 29, with some components removed for clarity purposes only. Latch mechanism 16 includes a ratchet 32 and a pawl 34, and a release lever, also referred to as release link, pawl release link, pawl release lever, or pawl lever 36. Ratchet 32 is movable about a ratchet pivot axis, shown as being defined by a ratchet post or rivet 33, between a striker capture position, whereat ratchet 32 retains both striker 18 with a striker slot 38 of ratchet 32 and swing door 12 in closed position, and a striker release position, whereat ratchet 32 permits release of striker 18 from a fishmouth 19 provided by latch housing of latch assembly 10 to allow movement of swing door 12 to the open position. A ratchet biasing member 40, such as a spring, is provided to normally bias ratchet 32 toward its striker release position. Pawl 34 is movable about a pawl pivot axis, shown as being defined by a pawl post or rivet 35, between a ratchet holding position, whereat pawl 34 holds ratchet 32 in its striker capture position, and a ratchet releasing position whereat pawl 34 permits ratchet 32 to move to its striker release position. A pawl biasing member 42, such as a suitable spring, is provided to normally bias pawl 34 toward its ratchet holding position.

Pawl release lever 36 is operatively (directly or indirectly via another component, such as an intermediate or secondary pawl release lever, and shown as directly, by way of example and without limitation) coupled, also referred to as connected, to pawl 34. Pawl release lever 36 is movable between a deployed position, also referred to as pawl release position, whereat pawl release lever 36 moves pawl 34 against the bias of pawl biasing member 42 to its ratchet releasing position, and a non-deployed position, also referred to as home position, whereat pawl release lever 36 permits pawl 34 to be in its ratchet holding position. A pawl release lever biasing member, such as a suitable spring, including pawl biasing member 42, by way of example and without limitation, can be provided to normally bias pawl release lever 36 to its home position.

Pawl release lever 36 can be moved in a normal powered actuation to its pawl release position via selective powered actuation of power release actuator 30. Power release actuator 30 has an output, shown as being provided by an output member, also referred to as output shaft 48, with a power release gear 52 configured in meshed engagement with an output gear, also referred to a main drive gear or drive gear 50. Drive gear 50 is shown, by way of example and without limitation, as a worm gear mounted on output shaft 48, with drive gear 50 beingnd fixed for conjoint rotation with the output shaft 48 of power release actuator 30. Driven movement of power release gear 52 from a home position (HP) in a first direction (clockwise, as viewed in FIG. 3A) to a full travel release position, also referred to as power child lock position, is configured to move pawl release lever 36 to its pawl release position, whereat pawl 34 is moved to its ratchet releasing position. Powered movement of pawl release lever 36 to its pawl release position can be effected via movement of a power release gear cam member 43 (FIG. 3A) fixed to power release gear 52. Cam member 43 is driven into engagement with an actuator lever 45, whereupon actuator lever 45 is driven clockwise, as viewed in FIG. 3A, to bring a drive surface 47 of actuator lever 45 in driving engagement with pawl lever 36, thereby driving pawl lever 36 and pawl 34 to its ratchet releasing position.

When desired, pawl 34 can be moved from the (its) ratchet holding positon to the (its) ratchet releasing position during normal use conditions, such as when a person approaches motor vehicle 14 with electronic key fob 28 (FIG. 2) and actuates the outside door handle 26, for example, sensing both the presence of key fob 28 and that outside door handle 26 has been actuated (e.g. via electronic communication between an electronic switch 62 (FIG. 2, wherein inside door handle 24 also is actuatable via an electronic switch 63) and a latch electronic control unit (ECU) shown at 64 that at least partially controls the operation of latch assembly 10). In turn, latch ECU 64 actuates (energizes) power release motor 30 to cause drive gear 50 to be rotatably driven by rotating the output shaft 48 of the power actuator 30 in a first direction, thereby causing power release gear 52 to be rotatably driven clockwise from its home position in the first direction to its full travel release position to release the latch mechanism 16 and shift latch assembly 10 into an unlatched operating state so as to facilitate subsequent opening of vehicle swing door 12. Power release motor 30 can be alternatively activated as part of a proximity sensor based entry feature (radar based proximity detection for example). For example when a person approaches vehicle 14 with electronic key fob 28 (FIG. 2) and actuates a proximity sensor 66, such as a capacitive sensor, or other touch/touchless based sensor (based on a recognition of the proximity of an object, such as the touch/swipe/hover/gesture or a hand or finger), (e.g. via communication between the proximity sensor 66 and latch ECU 64 that at least partially controls the operation of latch assembly 10). In turn, if detecting a normal use condition, such as the presence of electronic key fob 28, by way of example and without limitation, latch ECU 64 signals power release motor 30 to be actuated to rotate the output shaft 48 in the first direction to release the latch mechanism 16 and shift latch assembly 10 into an unlatched operating state so as to facilitate subsequent opening of vehicle door 12, as discussed above.

Then, upon release of power latch assembly 10, ECU 64, upon receiving a signal from a position sensor 67, which can be configured to detect the relative position of power release gear 52 via one or more features fixed to power release gear 52, ratchet 32 and/or pawl 34, by way of example and without limitation, signals power release motor 30 to rotate in an opposite direction. Rotation of power release motor 30 in the opposite direction causes a reversal in motion of power release gear 52 in a counterclockwise direction, whereupon pawl release lever 36 is allowed to return to its home position, such as under the bias of pawl release lever biasing member 44, thus, returning pawl 34 to the ratchet holding position.

Figure 3A:
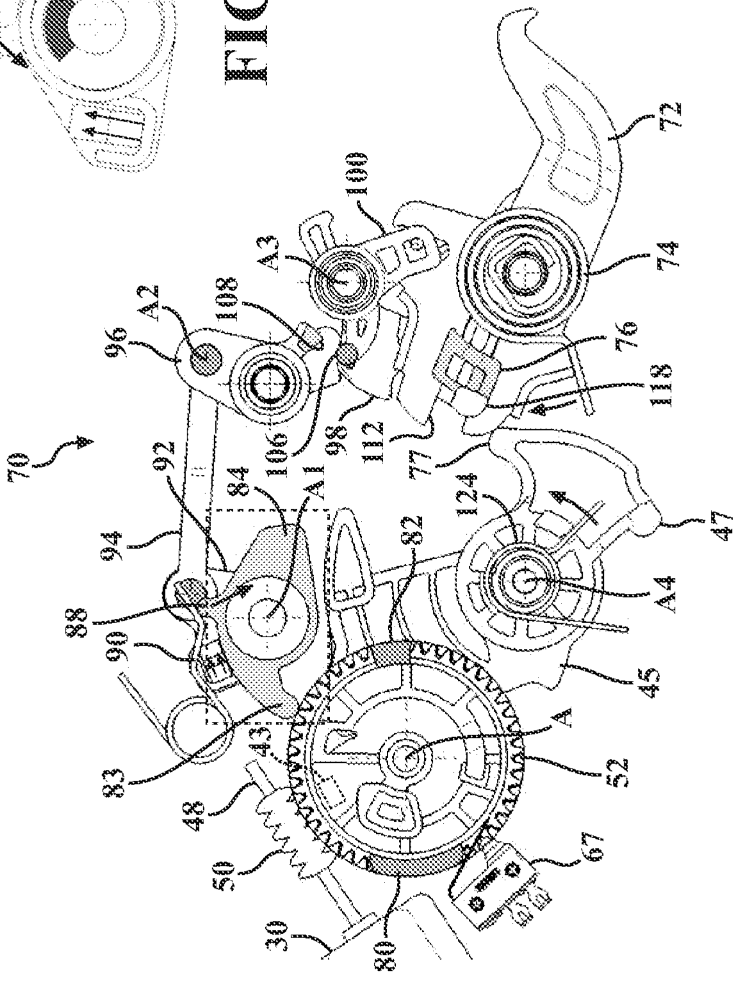
FIG. 3A is a fragmentary front plan view of the power latch assembly of FIG. 2 illustrating an actuation mechanism while in an unlocked position with a power release gear shown in a home position.
Figure 4:
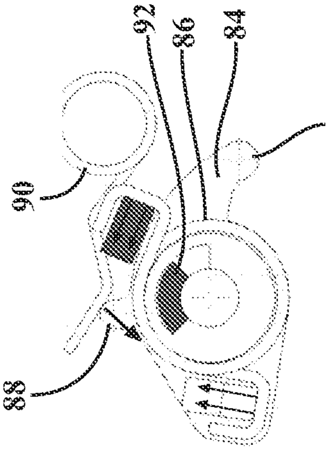
FIG. 4 is an enlarged plan view of a transmission sector of the power latch assembly of FIG. 2 illustrating a transmission spring and toggle spring therefor.
Figure 3B:
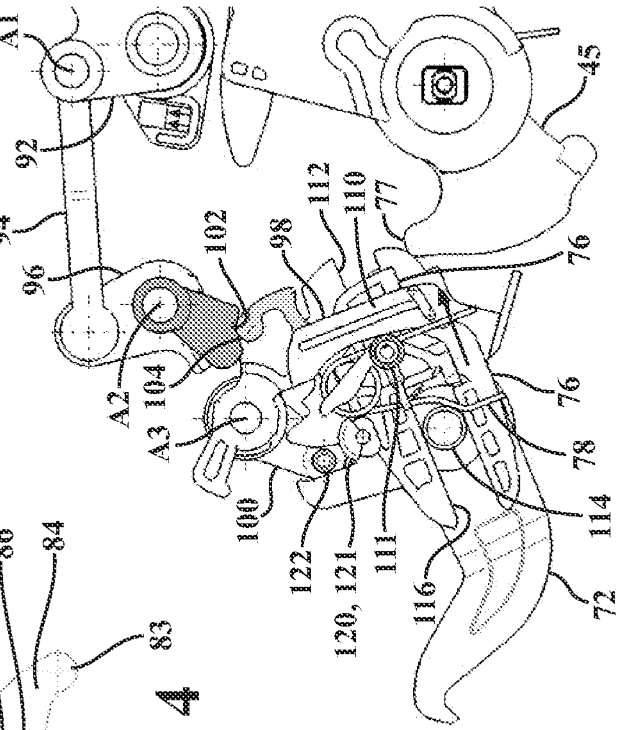
FIG. 3B is rear plan view of FIG. 3A.
Figure 5B:
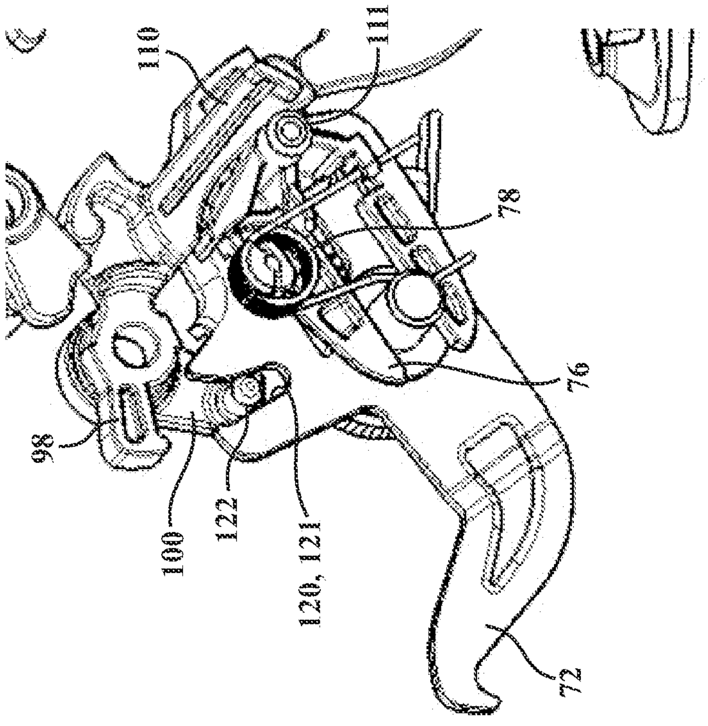
FIG. 5B is rear perspective view of FIG. 5A.
Figure 5A:
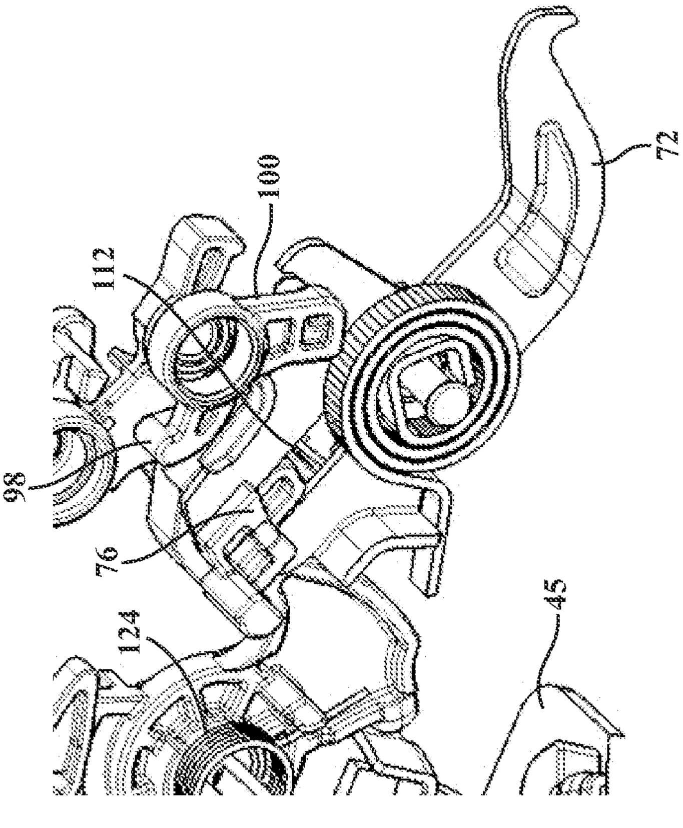
FIG. 5A is a fragmentary front perspective view of the power latch assembly of FIG. 2 illustrating an inside lock link configured for engagement with an actuator lever.
Figure 6A:
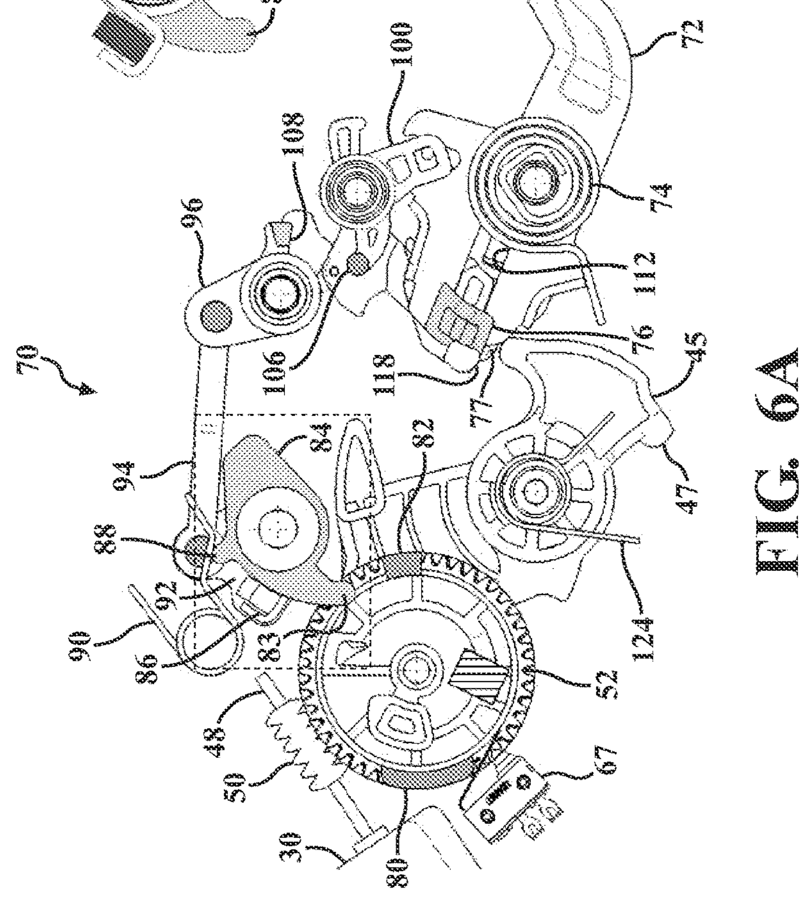
FIG. 6A is a view similar to FIG. 3A illustrating a power release gear of the actuation mechanism of the power latch assembly while in a home position, whereat the actuation mechanism is shown in a double pull off state and a child lock off state.
Figure 6B:
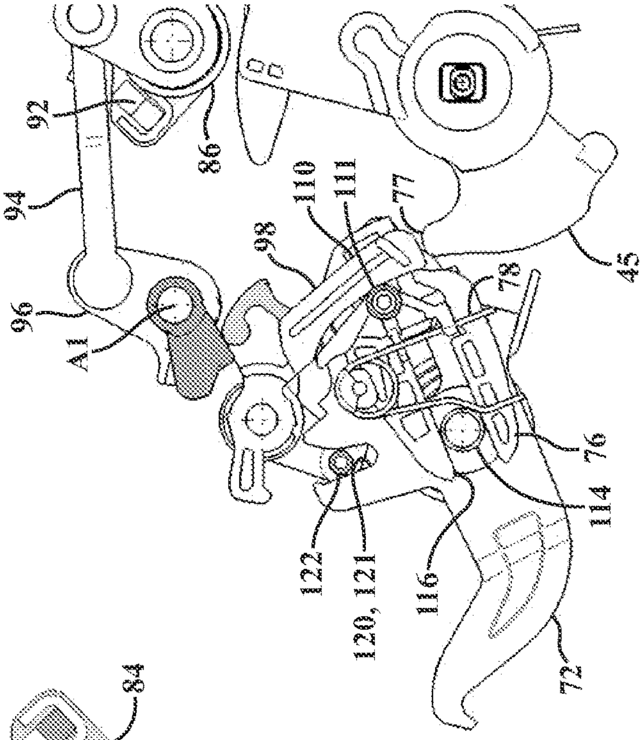
FIG. 6B is fragmentary rear plan view of FIG. 6A.
Figure 6C:
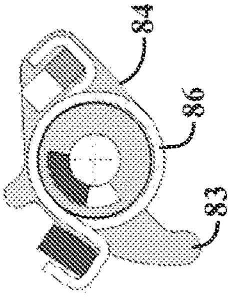
FIG. 6C is a view similar to FIG. 4 of the transmission sector, transmission spring and toggle spring while the power release gear of the actuation mechanism is in the home position, and the actuation mechanism is in the double pull off state and the child lock off state.
Figure 7B:
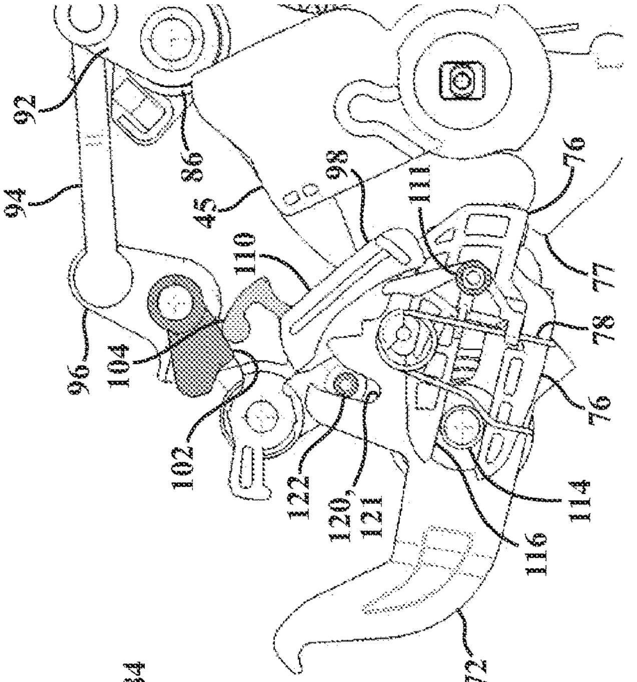
FIG. 7B is fragmentary rear plan view of FIG. 7A.
Figure 7C:
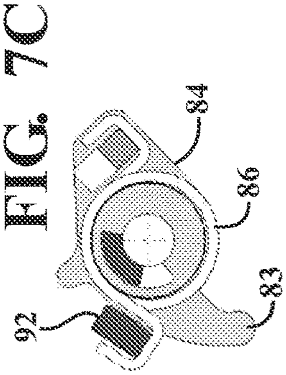
FIG. 7C is a view similar to FIG. 6C of the transmission sector, transmission spring and toggle spring while the power release gear is in the home position, with the actuation mechanism in the double pull off state and the child lock off state.
Figure 7A:
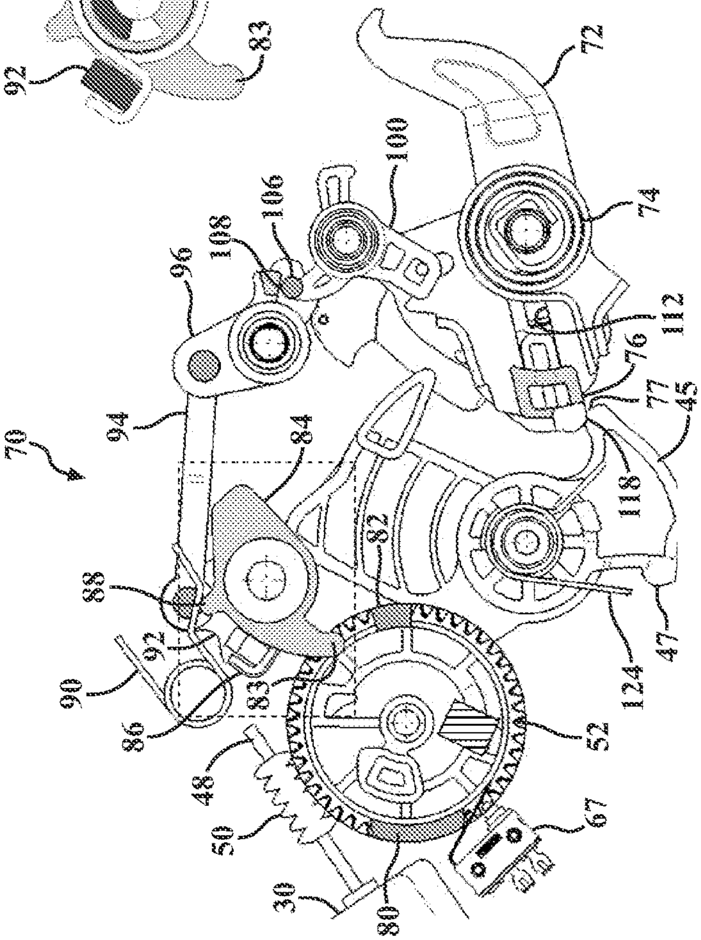
FIG. 7A is a view similar to FIG. 6A illustrating a first pull of an inside release lever of the actuation mechanism while the power release gear is in the in the home position, with the actuation mechanism in the double pull off state and the child lock off state.
Figure 8B:
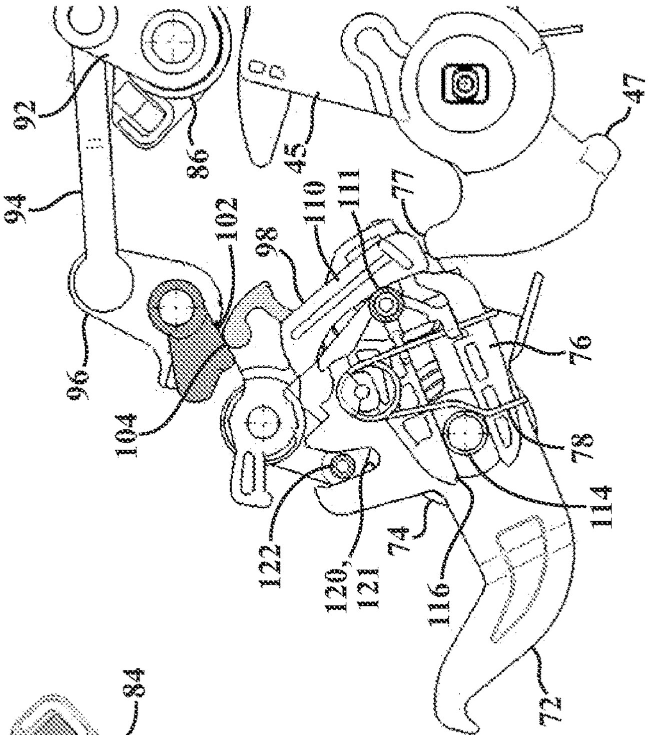
FIG. 8B is fragmentary rear plan view of FIG. 8A.
Figure 8C:
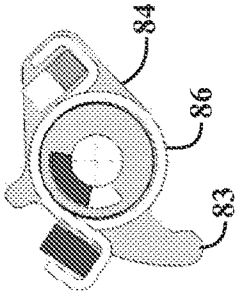
FIG. 8C is a view similar to FIG. 6C of the transmission sector, transmission spring and toggle spring while the power release gear is in the home position, with the actuation mechanism in the double pull off state and the child lock off state upon completion of the first pull.
Figure 8A:
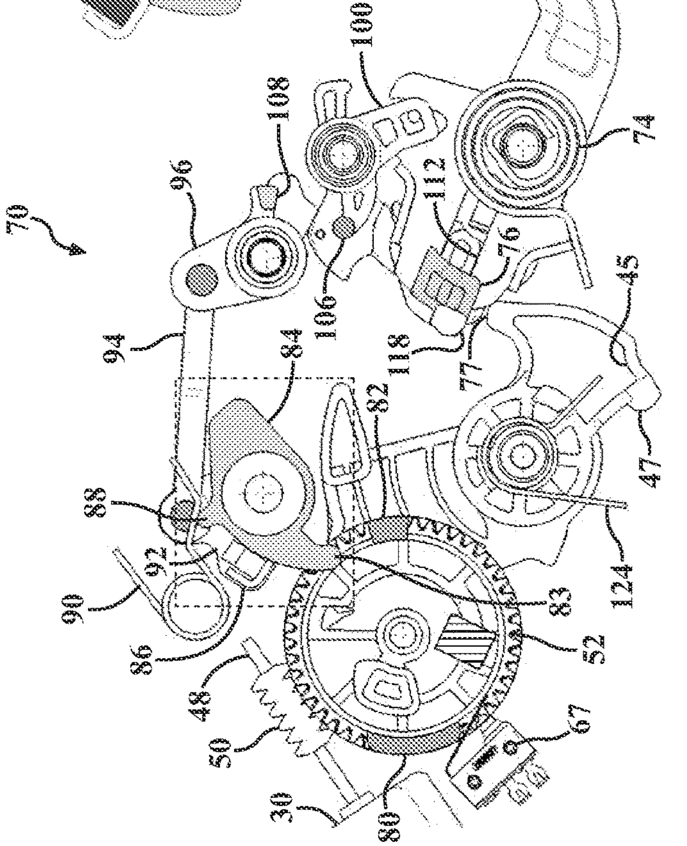
FIG. 8A is a view similar to FIG. 7A after release of the inside release lever of the actuation mechanism upon completing the first pull.

In addition to the normal power release performed via selective powered actuation of electric motor 30, power release gear 52 can be driven from its home position HP initially in the counterclockwise second direction, as viewed in FIG. 3A, to move an actuation mechanism 70 from a double pull OFF state and a child lock OFF state, to one of a double pull ON state or a child lock ON state, as desired, via selective powered actuation of electric motor 30, as discussed further below.

Actuation mechanism 70, while in its double pull OFF state and child lock OFF state, allows a single actuation of inside release mechanism 24 to move pawl 34 from it ratchet holding position to its ratchet releasing position, as illustrated in FIG. 6A-8B. Selective actuation of actuation mechanism 70 can be effected via inside release mechanism 24. Mechanical actuation (pull) of inside release mechanism 24 (FIGS. 7A and 7B) moves an inside release lever 72, such as pivotably, against a bias imparted by an inside release lever biasing member 74, shown as a coil spring, by way of example and without limitation, from a rest position to a deployed position. Movement of the inside release lever 72 to the deployed position causes an inside lock link 76 to move into engagement with a driven surface 77 of actuator lever 45, shown as a protrusion opposite drive surface 47, whereupon actuator lever 45 is rotatably driven to bring drive surface 47 into driving engagement with pawl lever 36, whereupon pawl 34 is driven to its ratchet releasing position. Inside lock link 76 is biased by an inside lock link biasing member 78, shown as a torsion spring, by way of example and without limitation, to a rest, engaged position, whereat inside lock link 76 is positioned for engagement with driven surface 77 of actuator lever 45 upon actuation of inside release lever 72.

Figures 9A, 9B, 9C:
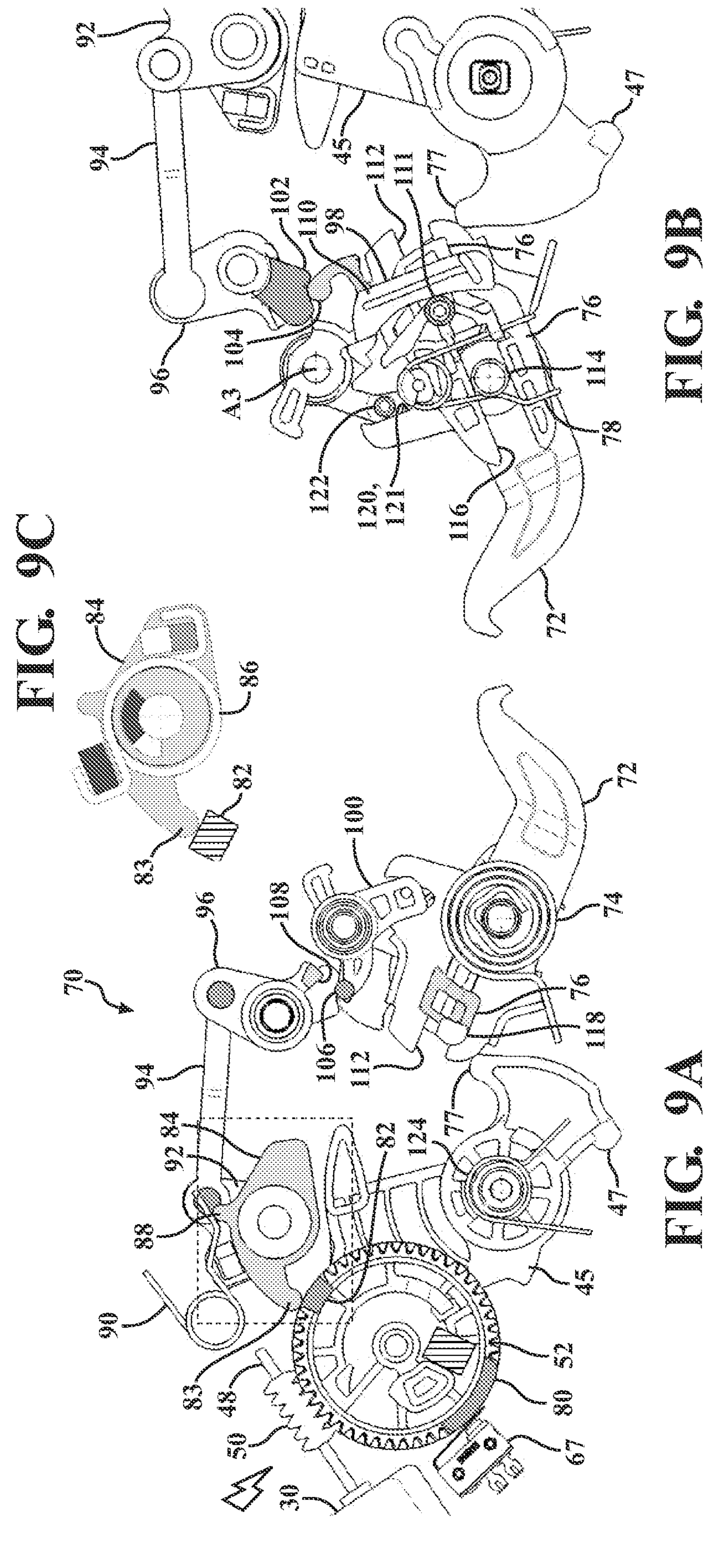
FIG. 9A is a view similar to FIG. 3A illustrating the power release gear of the actuation mechanism of the power latch assembly while moved from the home position to a power child lock position, whereat the actuation mechanism is in a double pull off state and a child lock on state.
FIG. 9B is fragmentary rear plan view of FIG. 9A.
FIG. 9C is a view similar to FIG. 6C of the transmission sector, transmission spring and toggle spring while the power release gear is in the power child lock position, with the actuation mechanism in the double pull off state and the child lock on state.
Figure 10B:
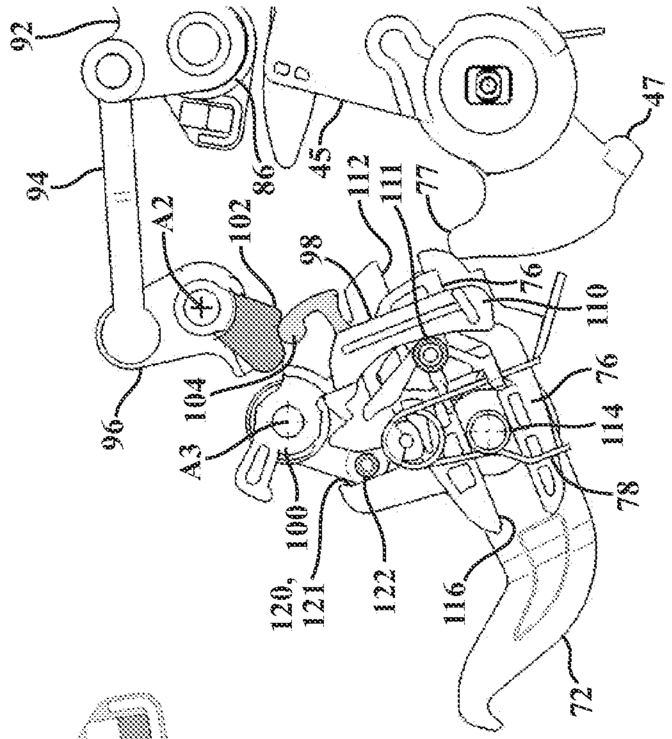
FIG. 10B is fragmentary rear plan view of FIG. 10A.
Figure 10C:
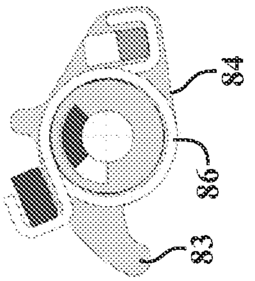
FIG. 10C is a view similar to FIG. 6C of the transmission sector, transmission spring and toggle spring while the power release gear is in the home position, with the actuation mechanism in the double pull on state and the child lock off state.
Figure 10A:
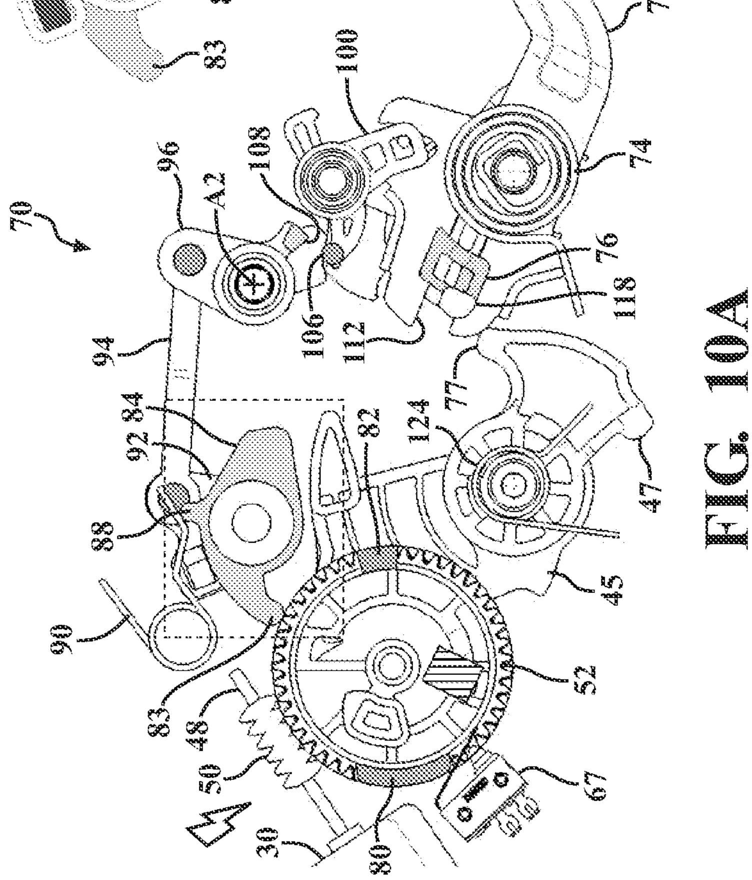
FIG. 10A is a view similar to FIG. 9A illustrating the power release gear of the actuation mechanism of the power latch assembly while moved from the power child lock back to the home position, whereat the actuation mechanism is in a double pull on state and the child lock off state.

When desired to move latch assembly 10 to the double pull ON state, as shown in FIGS. 9A-10B whereat two successive actuations of inside release lever 72 are required to move pawl 34 to it ratchet releasing position, power release actuator 30 is energized to drive power release gear 52 counterclockwise about axis A from the home position (HP) to the power child lock position (PCL) (FIG. 9A), and then power release gear 52 is driven back in the clockwise direction from the power child lock position (PCL) to the home position (HP)(FIG. 10A). Upon driving power release gear 52 counterclockwise from the home position (HP) to a power child lock position (PCL), position sensor 67 is activated via a sensor lug 80 fixed to power release gear 52 (position sensor 67 is configured in electrical communication with ECU 64 to indicate power release gear 52 being in the power child lock position (PCL)). At the same time, during rotation of power release gear 52 in the counterclockwise direction, a power child lock lug, also referred to as lock lug 82 is brought into engagement with a driven extension, also referred to as nose 83 of a transmission sector 84, whereupon transmission sector 84 is rotatably driven about an axis A1 from its home position to a deployed position. As transmission sector 84 is rotated from the home position, a radially outwardly extending protrusion, also referred to detent 88, of transmission sector 84 is moved against a bias of a biasing member, shown as a torsion spring, and referred to hereafter as toggle spring 90. Toggle spring 90 acts to releasably hold transmission sector 84 in its home position until the force imparted by toggle spring 90 is overcome under the driven force applied by lug 82 on nose 83 until transmission sector 84 reaches it deployed position, whereat toggle spring 90 releasably holds transmission sector 84 in its deployed position. With transmission sector 84 in its deployed position, lock lug 82 is radially aligned in confronting relation with nose 83, such that transmission sector 84 is temporarily blocked from returning to its home position by lock lug 82. With transmission sector 84 blocked from returning to its home position, as discussed further, latch assembly 10 is temporarily positioned in its child lock ON state (FIG. 9A). Then, with ECU 64 detecting power release gear 52 having reached the power child lock position (PCL), ECU 64 commands power release actuator 30 to return power release gear 52 from the power child lock position (PCL) to its position (HP) (FIG. 10A), whereat lock lug 82 is moved out from blocking engagement with nose 83, whereupon latch assembly 10 is changed from the child lock ON state to the child lock OFF state and to the double pull ON state.

To complete transition of latch assembly 10 to the double pull ON state, as transmission sector 84 is moved from its home position to its deployed position, a transmission sector biasing member, shown as a transmission coil spring 86, imparts a bias on a power child lock sector, referred to hereafter as child lock sector 92, to pivot child lock sector 92 about a common axis A1 with transmission sector 84. Child lock sector 92 is pivotably coupled to a power child lock link, referred to hereafter as lock link 94, which in turn is pivotably coupled to an inside lock sector 96. Inside lock sector 96 is supported for pivotal movement about an axis A2, in response to rotation of child lock sector 92, for selective engagement with an inside lock lever 98 and a double pull lever 100. Inside lock lever 98 and double pull lever 100 are configured for pivotal movement about a common axis A3. Inside lock sector 96 has a drive surface 102 configured for driving engagement with a driven surface 104 of inside lock lever 98, and double pull lever 100 has a drive surface 106 configured for driving engagement with a driven surface 108 of inside lock sector 96. As drive surface 102 drives driven surface 104, inside lock lever 98 is driven rotatably in a counterclockwise direction about axis A3 (as viewed in FIG. 9B), whereupon a drive arm 110 of inside lock lever 98 engages a driven surface, also referred to as lug 111, of inside lock link 76 to move inside lock link 76 against the bias imparted by inside lock link biasing member 78. As inside lock link 76 is moved against the bias imparted by inside lock link biasing member 78, inside lock link 76 translates within a slot 112 of inside release lever 72, with a pin 114 extending from inside release lever 72 being guided along a slot 116 of inside lock link 76, thereby moving a drive lug 118 of inside lock link 76 out from possible engagement with driven surface 77 of actuator lever 45.

Figure 11B:
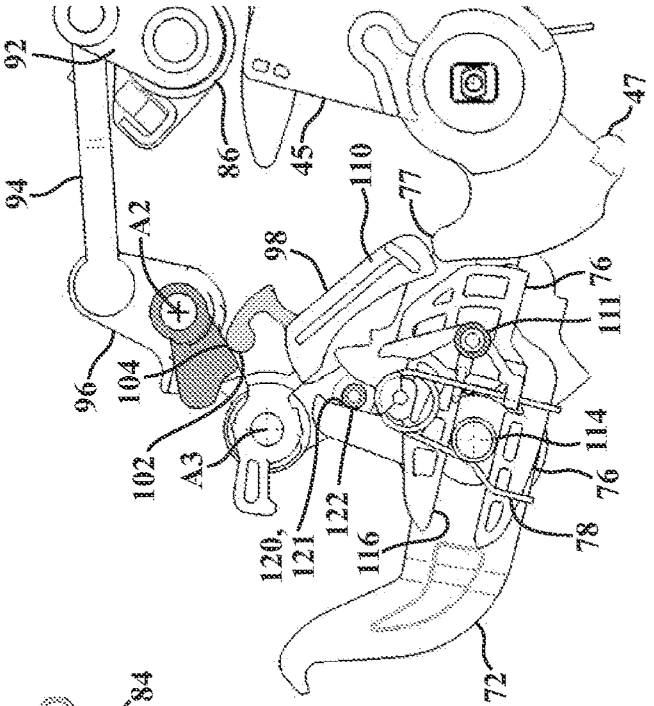
FIG. 11B is fragmentary rear plan view of FIG. 11A.
Figure 11C:
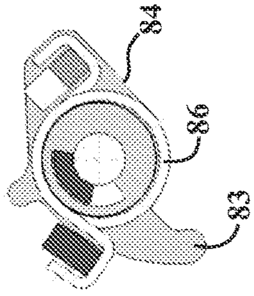
FIG. 11C is a view similar to FIG. 6C of the transmission sector, transmission spring and toggle spring while the power release gear is in the home position, with the actuation mechanism in the double pull off state and the child lock off state.
Figure 11A:
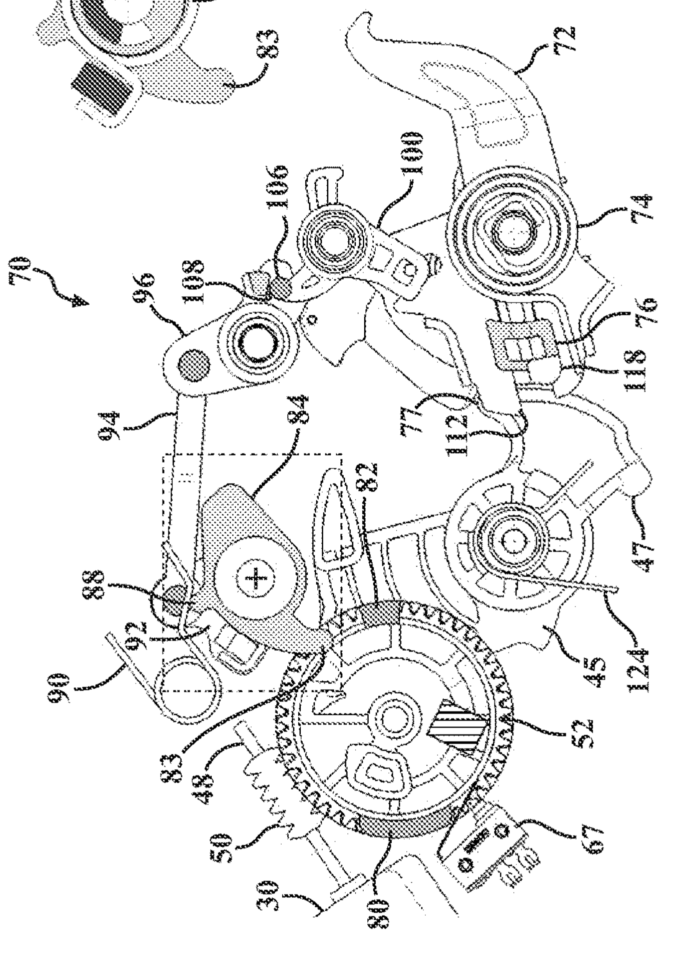
FIG. 11A is a view similar to FIG. 10A illustrating a first pull of the inside release lever of the actuation mechanism while the power release gear is in the in the home position, whereupon the actuation mechanism moves from the double pull on state and child lock off state back to the double pull off state and child lock off state.
Figures 12A, 12B, 12C:
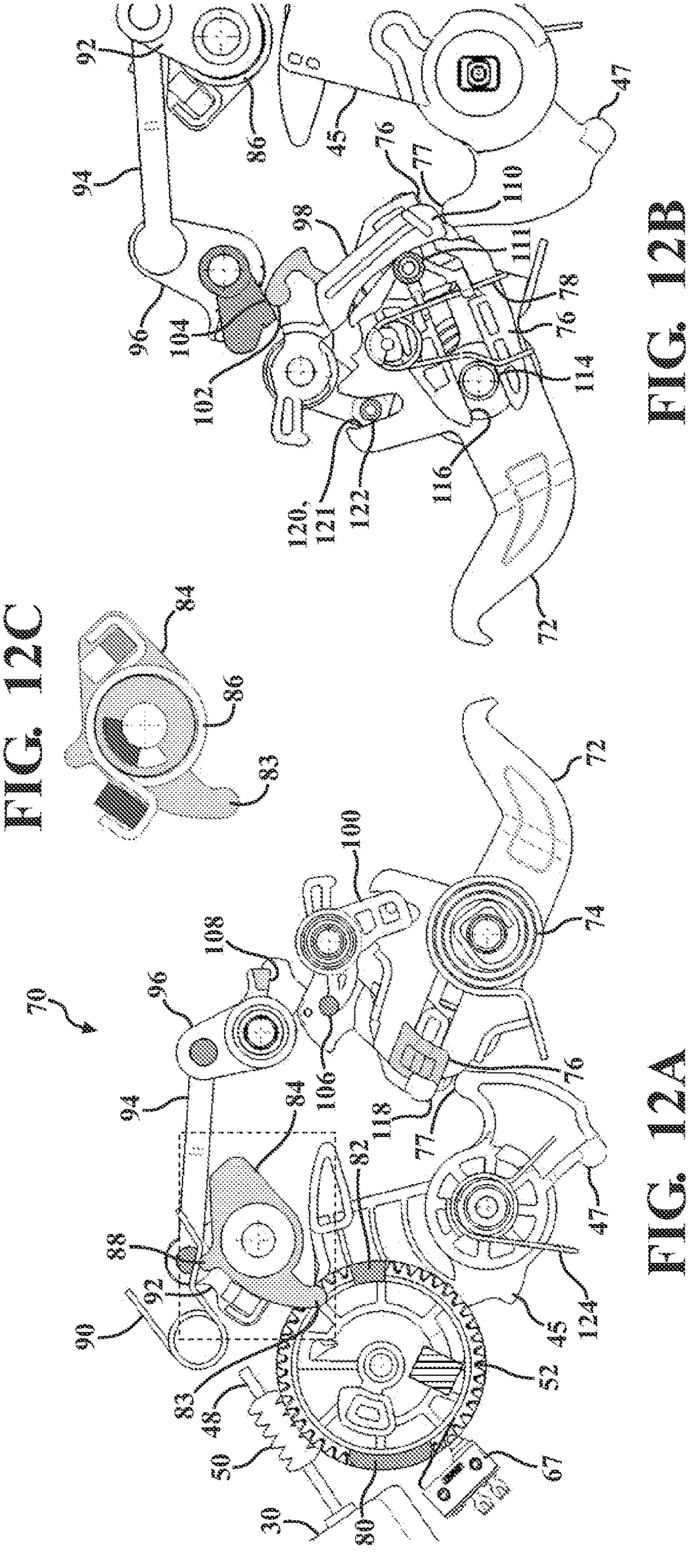
FIG. 12A is a view similar to FIG. 11A after release of the inside release lever of the actuation mechanism upon completing the first pull.
FIG. 12B is fragmentary rear plan view of FIG. 12A.
FIG. 12C is a view similar to FIG. 6C of the transmission sector, transmission spring and toggle spring while the power release gear is in the home position, with the actuation mechanism in the double pull off state and the child lock off state upon completion of the first pull.

While in the double pull On state (FIGS. 10A and 10B), a first pull of inside release lever 72, as driven by actuation of inside release mechanism 24, causes a drive surface 120, shown as one side of a slot 121 in inside release lever 72, to engage of driven member 122, shown as a pin fixed to double pull lever 100 and extending into slot 121, thereby causing double pull lever 100 to be rotated about axis A3 in a counterclockwise direction, as viewed in FIGS. 10B and 11B. As double pull lever 100 is rotated in response to movement of inside release lever 72, drive surface 106 of double pull lever 100 engages and drives driven surface 108 of inside lock sector 96, thereby causing inside lock lever 96 to rotate about axis A2 in a counterclockwise direction, as viewed in FIGS. 10A and 11A, thereby rotating drive surface 102 of inside lock sector 96 relative to driven surface 104 of inside lock lever 98, thus, allowing inside lock lever 98 to move under the bias of inside lock link biasing member 78, whereupon inside lock link 76 is free to translate along pin 114. As inside lock lever 98 rotates about axis A2, lock link 94 is driven to the left, as viewed in FIG. 11A, thereby causing child lock sector 92 to be driven in a counterclockwise direction, thereby driving transmission sector 84 in a counterclockwise direction to move detent 88 against the bias of toggle spring 90, whereupon nose 83 is brought back into potential engagement with lock lug 82. During the first pull of inside release lever 72, drive lug 118 bypasses driven surface of actuator lever 45, thereby causing pawl 34 to remain in its ratchet holding position, and thus, latch assembly 10 to remain in its latched state. Then, upon release of the first pull force on inside release lever 72, inside release lever 72 returns to it home position (FIGS. 12A and 12B) under the bias of inside release lever biasing member 74, whereupon inside lock link 76 returns to its home position under the bias of inside lock link biasing member 78, whereat drive lug 118 is brought into aligned, confronting relation with driven surface 77 of actuator lever 45. As such, upon completing of the first pull, actuation mechanism 70 is returned to both its double pull OFF position and child lock OFF position.

Figure 13B:
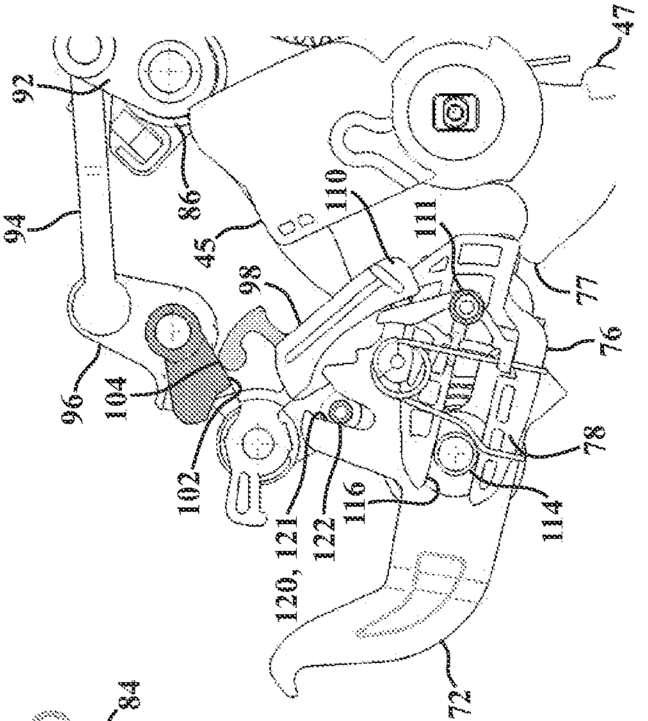
FIG. 13B is fragmentary rear plan view of FIG. 13A.
Figure 13C:
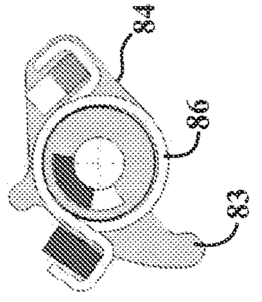
FIG. 13C is a view similar to FIG. 6C of the transmission sector, transmission spring and toggle spring while the power release gear is in the home position, with the actuation mechanism in the double pull off state and the child lock off state.
Figure 13A:
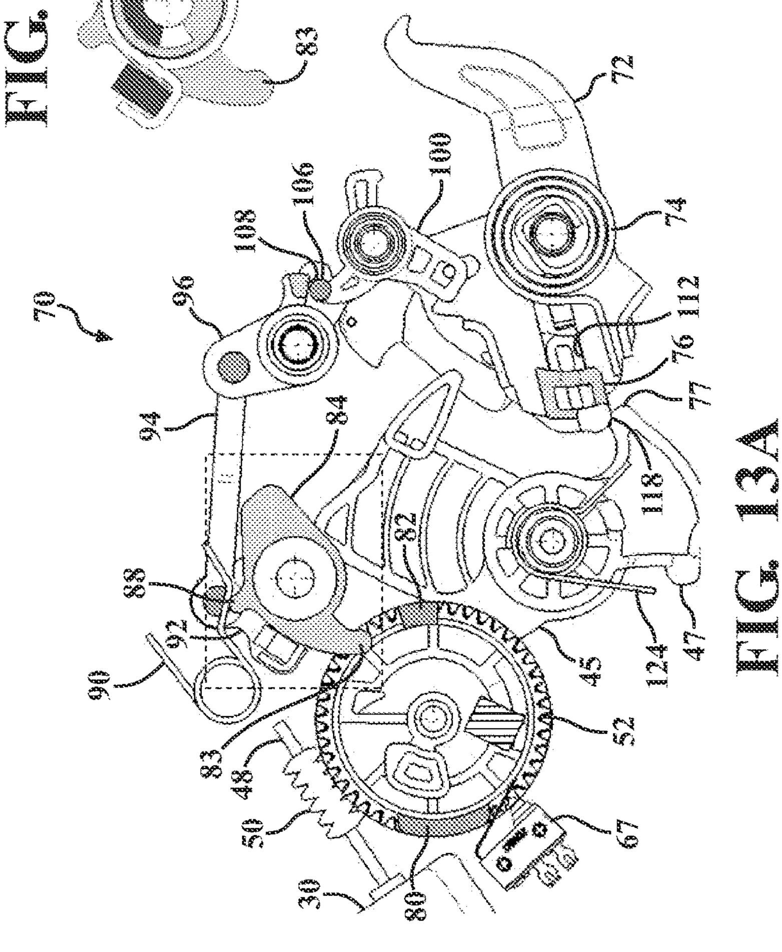
FIG. 13A is a view similar to FIG. 12A illustrating a second pull of the inside release lever of the actuation mechanism while the power release gear is in the in the home position, with the actuation mechanism in the double pull off state and the child lock off state.

With actuation mechanism 70 returned to its double pull OFF position and child lock OFF position, a second pull of inside release lever 72 (FIGS. 13A and 13B) causes drive lug 118 of inside lock link 76 to engage and drive driven surface 77 of actuator lever 45, thereby rotating actuator lever 45 about an axis A4 against a bias imparted by an actuator lever biasing member 122, shown as a torsion spring, by way of example and without limitation, to cause drive surface 47 of actuator lever 45 to drive pawl lever 36 sufficiently to move pawl 34 from its ratchet holding position to its ratchet releasing position. Accordingly, the second pull of inside release lever 72 via inside release mechanism 24 causes latch assembly 10 to move to its unlatched position, whereupon actuation mechanism 70 remains in its double pull OFF position and child lock OFF position.

Figures 15A, 15B, 15C:
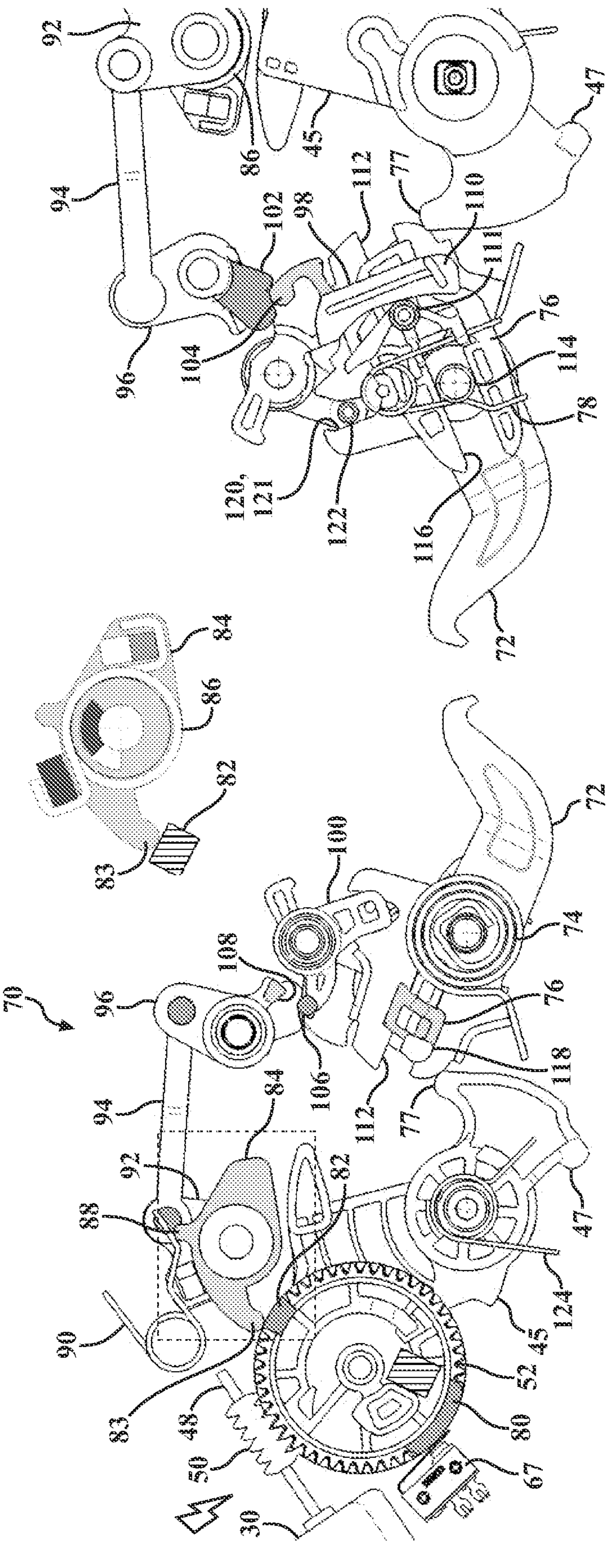
FIG. 15A is a view similar to FIG. 9A illustrating the power release gear of the actuation mechanism of the power latch assembly while moved from the home position to a power child lock position, whereat the actuation mechanism is in the double pull off state and the child lock on state.
FIG. 15B is fragmentary rear plan view of FIG. 15A.
FIG. 15C is a view similar to FIG. 9C of the transmission sector, transmission spring and toggle spring while the power release gear is in the power child lock position, with the actuation mechanism in the double pull off state and the child lock on state.
Figures 16A, 16B, 16C:
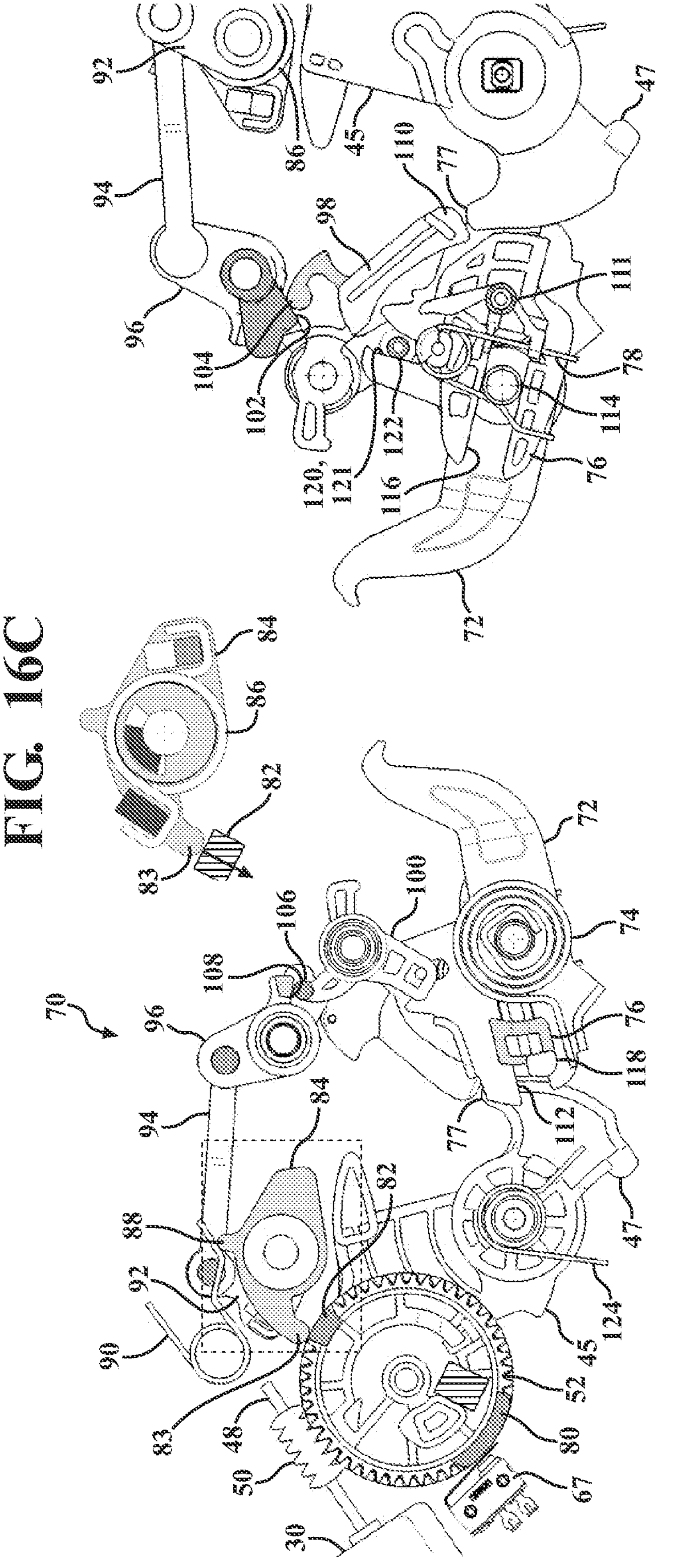
FIG. 16A is a view similar to FIG. 15A illustrating a pull of the inside release lever of the actuation mechanism while the power release gear is in the in the power child lock position, whereupon the actuation mechanism remains in the double pull off state and child lock on state.
FIG. 16B is fragmentary rear plan view of FIG. 16A.
FIG. 16C is a view similar to FIG. 6C of the transmission sector, transmission spring and toggle spring while the power release gear is in the power child lock position, with the actuation mechanism in the double pull off state and the child lock on state.
Figures 17A, 17B, 17C:
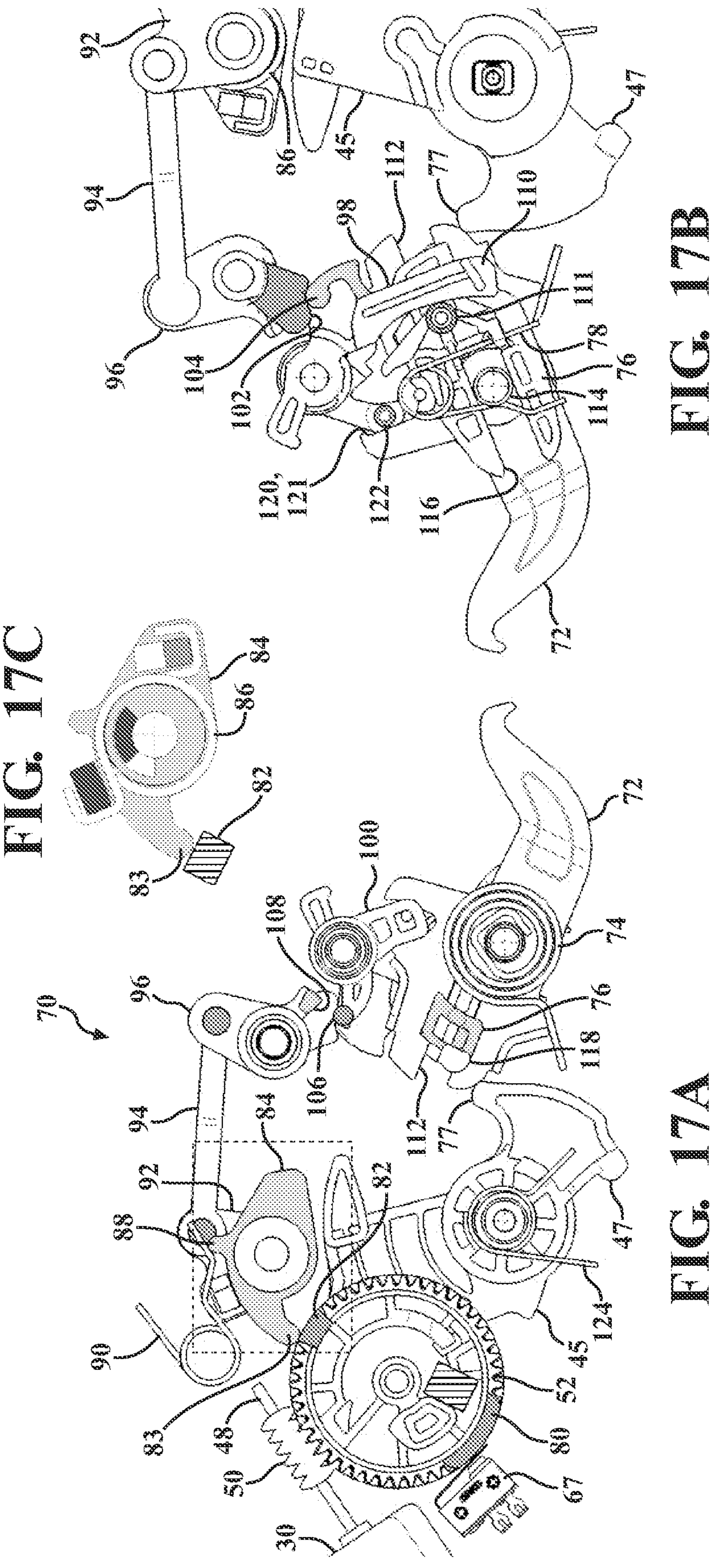
FIG. 17A is a view similar to FIG. 16A after release of the inside release lever of the actuation mechanism upon completing the pull of the inside release lever.
FIG. 17B is fragmentary rear plan view of FIG. 17A.
FIG. 17C is a view similar to FIG. 16C of the transmission sector, transmission spring and toggle spring while the power release gear is in the power child lock position, with the actuation mechanism in the double pull off state and the child lock on state upon completion of the pull of the inside release lever.

When desired to move actuation mechanism 70 to the double pull OFF, child lock ON state, power release actuator 30 is energized to drive power release gear 52 counterclockwise about axis A from the home position (HP) (FIG. 14A) to the power child lock position (PCL) (FIG. 15A), the same as discussed above with regard to FIG. 9A. Power release gear 52 remains in the power child lock position (PCL) as desired, whereat actuation mechanism 70 remains in the child lock ON state. As long as actuation mechanism 70 remains in the child lock ON state, as shown in FIGS. 16A-17B, any number of repeated pulls of inside release lever 72 fails to bring drive lug 118 into engagement with actuator lever 45, and thus, actuator lever 45, pawl release lever 36, pawl 34 and ratchet 32 remain stationary, and actuation mechanism 70 remains in the child lock ON state.

Figures 18A, 18B, 18C:
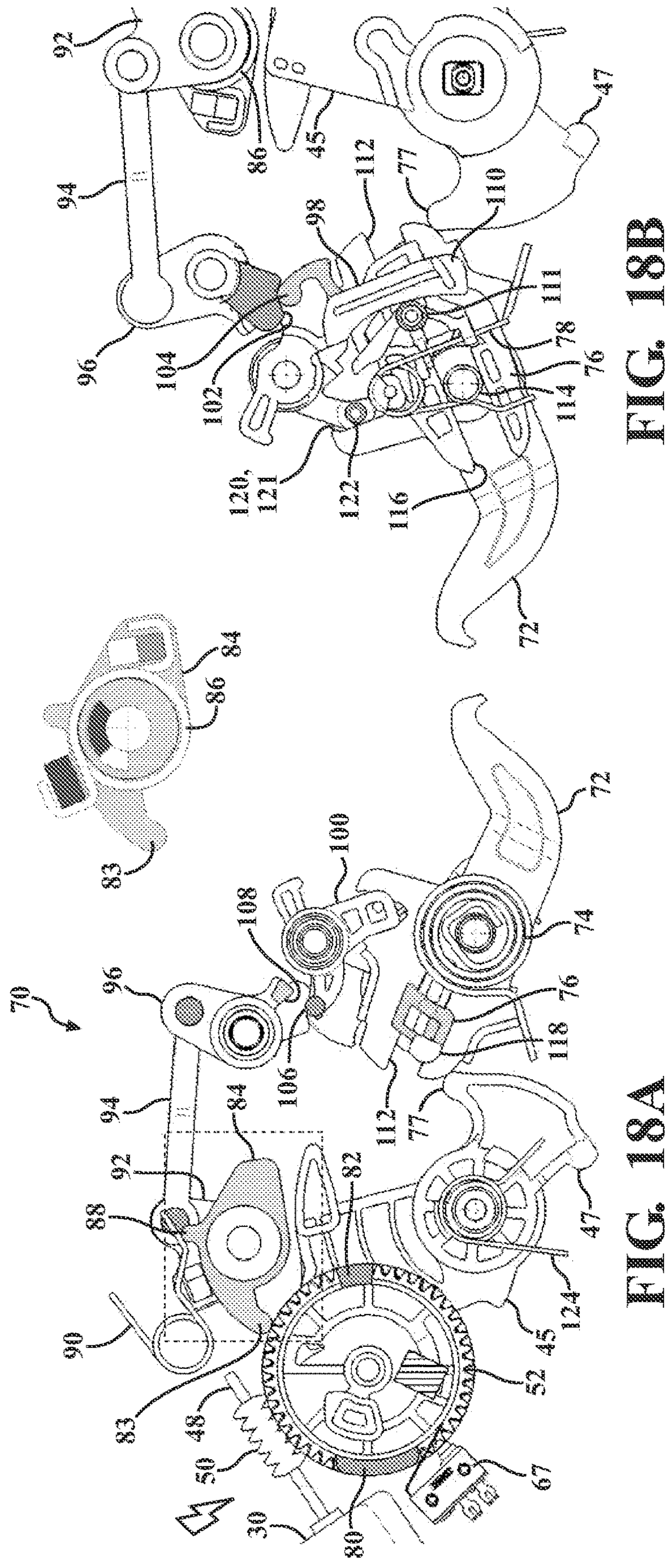
FIG. 18A is a view similar to FIG. 10A illustrating the power release gear of the actuation mechanism of the power latch assembly while moved from the power child lock back to the home position, whereat the actuation mechanism is moved from the child lock on state to the double pull on state, whereat a double pull of the inside release lever causes a power latch assembly to move from a latched state to an unlatched state.
FIG. 18B is fragmentary rear plan view of FIG. 18A.
FIG. 18C is a view similar to FIG. 10C of the transmission sector, transmission spring and toggle spring while the power release gear is in the home position, with the actuation mechanism in the double pull on state and the child lock off state.
Figure 19:
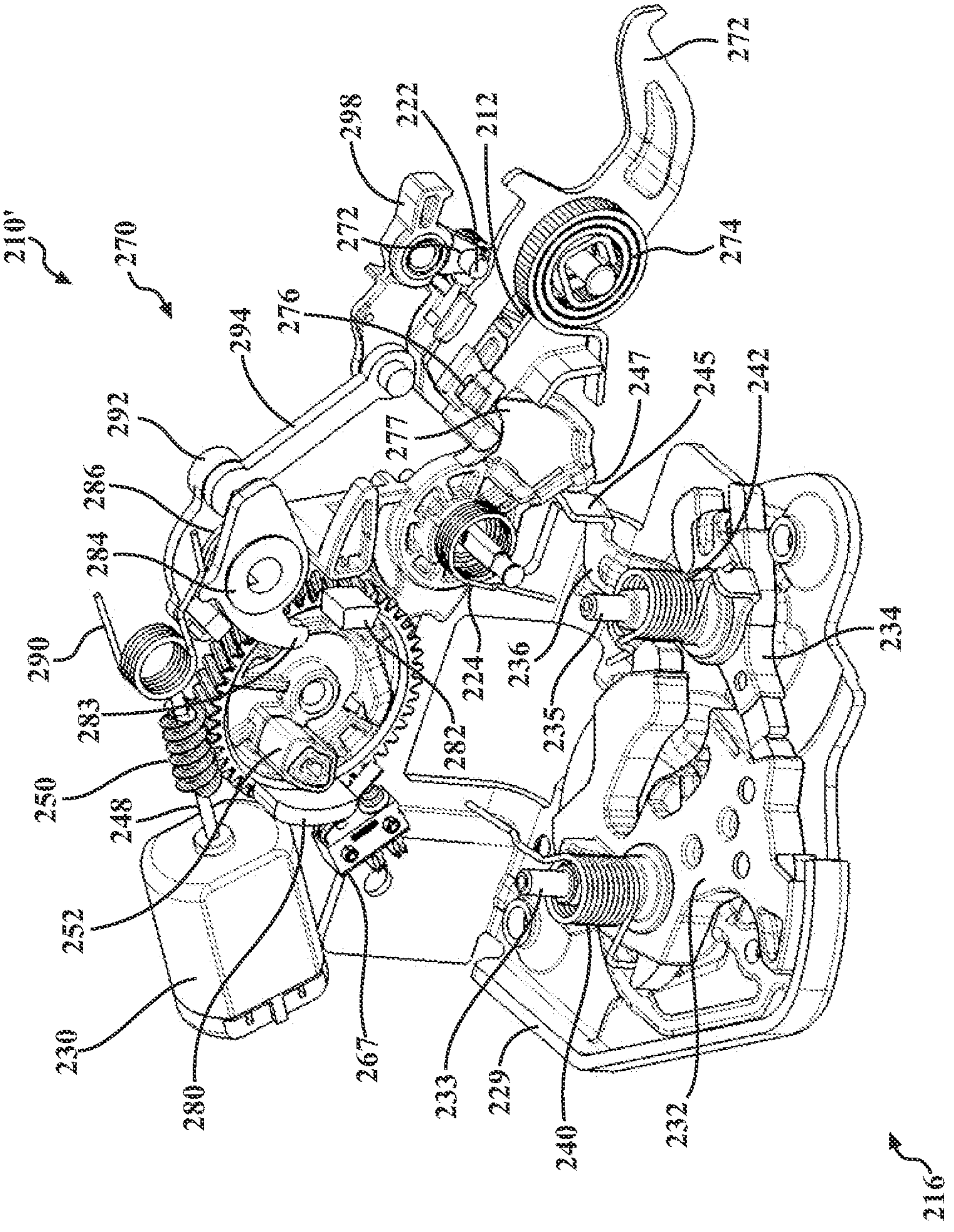
FIG. 19 is a front perspective view illustrating components of the power latch assembly of FIG. 1 embodying the teachings of another aspect of the present disclosure, with some components removed for clarity purposes only.

When desired to return actuation mechanism 70 to one of the double pull ON state, the double pull OFF, the child lock OFF state, power release gear 52 is moved via actuation of power release actuator 30 clockwise about axis A from the power child lock position (PCL) to the home position (HP) (FIG. 18A), whereat actuation mechanism 70 is moved to the double pull ON state. When in the double pull ON state, a double pull of inside release lever 72 via two pulls of inside release mechanism 24 causes actuation mechanism 70 to be returned to the double pull OFF, child lock OFF state, as discussed above with regard to FIGS. 11A-14B.

In FIGS. 19-35, a latch assembly 210 constructed in accordance with a further aspect of the disclosure is illustrated, wherein the same reference numerals as used above, offset by a factor of 200, are used to identify like features. Latch assembly 210 performs similar functions as described above for latch assembly 10; however, latch assembly 210 uses fewer components, thereby simplifying the manufacture, while reducing the weight and cost.

Latch assembly 210 includes a latch mechanism 216 configured to releasably latch and hold striker 18 mounted to sill portion 20 of vehicle body 22 when swing door 12 is closed, as discussed above for latch assembly 10. Thus, latch assembly 10 can be selectively actuated via mechanical actuation of inside release mechanism 24, outside release mechanism 26 and/or key fob 28 (FIG. 2). As will be detailed, latch assembly 210 is also configured to be power-operated to perform multiple functions, including effecting a power release, effecting an inside double pull release (via a double pull of inside release mechanism 24), and placing the latch assembly 210 in a power child lock position, via selective actuation of a single power release actuator, such as an electric motor 230. Latch mechanism 216 contained in a housing, shown in part via a latch frame plate 229, with some components removed for clarity purposes only. Latch mechanism 216 includes a ratchet 232 and a pawl 234, and a release lever, also referred to as release link, pawl release link, pawl release lever, or pawl lever 236. Ratchet 232 is movable about a ratchet pivot axis, shown as being defined by a ratchet post or rivet 233, between a striker capture position, whereat ratchet 232 retains both striker 18 and swing door 12 in closed position, and a striker release position, whereat ratchet 232 permits release of both striker 18 from fishmouth 19 provided by latch housing of latch assembly 210 to allow movement of swing door 12 to the open position. A ratchet biasing member 240, such as a spring, is provided to normally bias ratchet 232 toward its striker release position. Pawl 234 is movable about a pawl pivot axis, shown as being defined by a pawl post or rivet 235, between a ratchet holding position, whereat pawl 234 holds ratchet 232 in its striker capture position, and a ratchet releasing position whereat pawl 234 permits ratchet 232 to move to its striker release position. A pawl biasing member 242, such as a suitable spring, is provided to normally bias pawl 234 toward its ratchet holding position.

Pawl release lever 236 is operatively (directly or indirectly via another component, such as an intermediate or secondary pawl release lever, and shown as directly, by way of example and without limitation) coupled, also referred to as connected, to pawl 234. Pawl release lever 236 is movable between a deployed position, also referred to as pawl release position, whereat pawl release lever 236 moves pawl 234 against the bias of pawl biasing member 242 to its ratchet releasing position, and a non-deployed position, also referred to as home position, whereat pawl release lever 236 permits pawl 234 to be in its ratchet holding position under the bias of pawl biasing member 242, by way of example and without limitation.

Pawl release lever 236 can be moved in a normal powered actuation to its pawl release position via selective powered actuation of power release actuator 230 via commands sent to ECU 64, as discussed above for latch assembly 10. Power release actuator 30 has an output, shown as being provided by an output member, also referred to as output shaft 248, with a power release gear 252 configured in meshed engagement with an output gear, also referred to a main drive gear or drive gear 250, wherein drive gear 250 is shown as a worm gear mounted on output shaft 248. Driven movement of power release gear 252 from a home position (HP) in a first direction (clockwise, as viewed in FIG. 20A) to a full travel release position, also referred to as power child lock position, is configured to move pawl release lever 236 to its pawl release position, whereat pawl 234 is moved to its ratchet releasing position. Powered movement of pawl release lever 236 to its pawl release position can be effected via movement of a power release gear cam member 243 (FIG. 20A) fixed to power release gear 252. Cam member 243 is driven into engagement with an actuator lever 245, whereupon actuator lever 245 is driven clockwise, as viewed in FIG. 20A, to bring a drive surface 247 of actuator lever 245 in driving engagement with pawl lever 236, thereby driving pawl lever 236 and pawl 34 to its ratchet releasing position.

Figures 20A, 20B, 21:
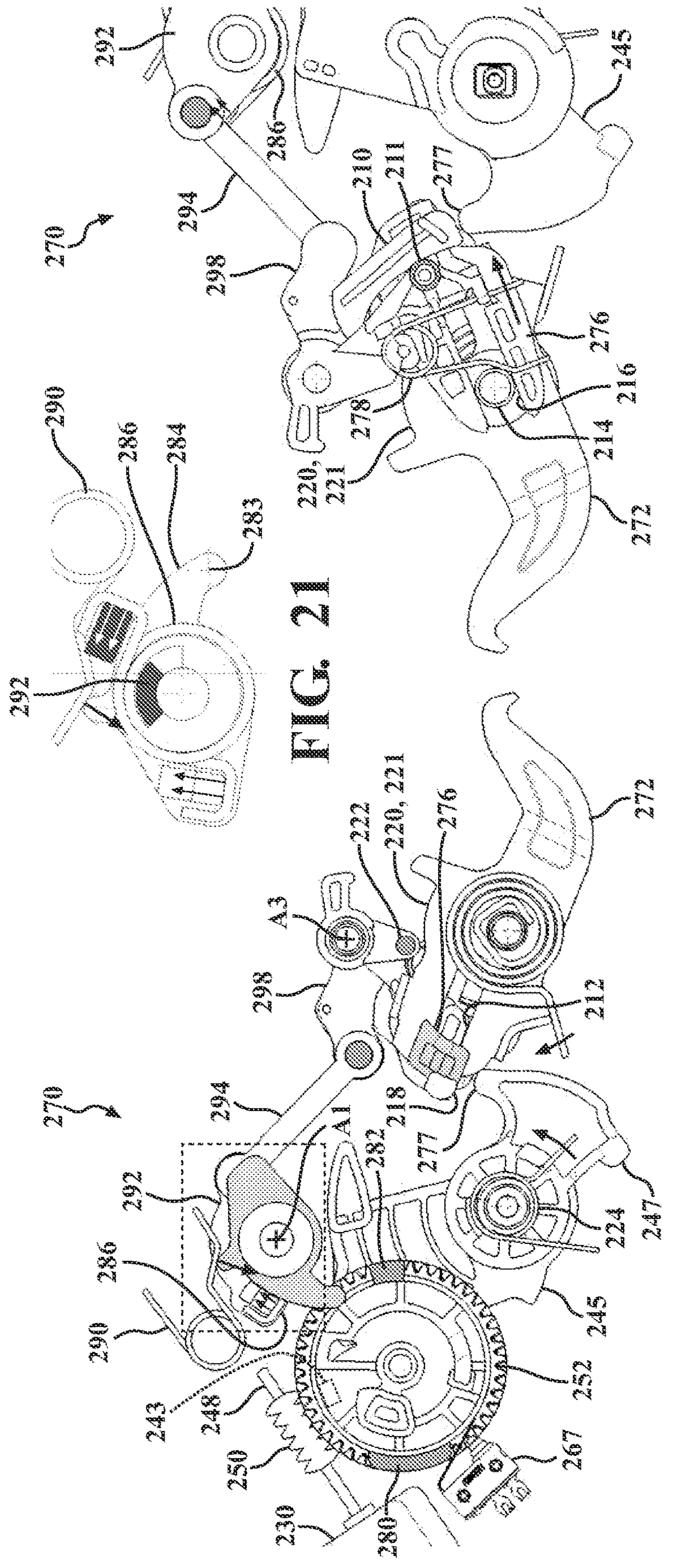
FIG. 20A is a fragmentary front plan view of the power latch assembly of FIG. 19 illustrating an actuation mechanism while in an unlocked position with a power release gear shown in a home position.
FIG. 20B is rear plan view of FIG. 20A.
FIG. 21 is an enlarged plan view of a transmission sector of the power latch assembly of FIG. 19 illustrating a transmission spring and toggle spring therefor.
Figure 22A:
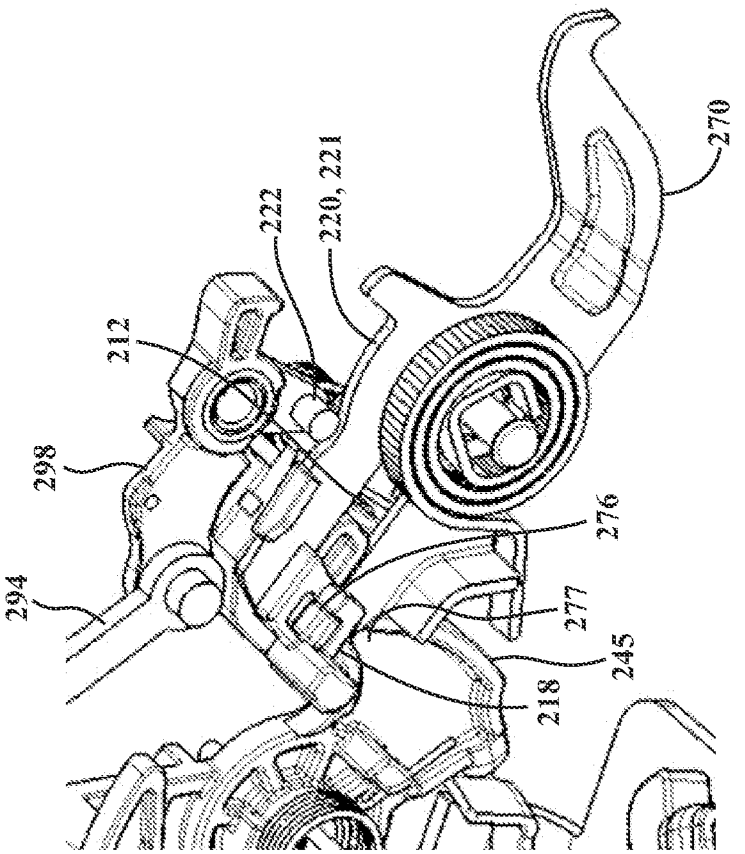
FIG. 22A is a fragmentary front perspective view of the power latch assembly of FIG. 19 illustrating an inside lock link configured for engagement with an actuator lever.
Figure 22B:
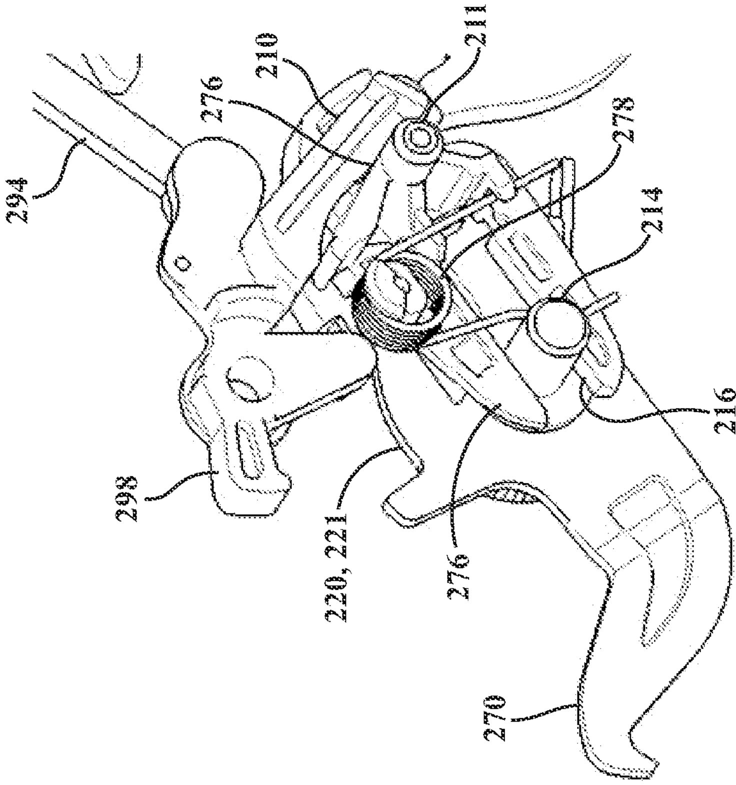
FIG. 22B is rear perspective view of FIG. 22A.
Figure 23B:
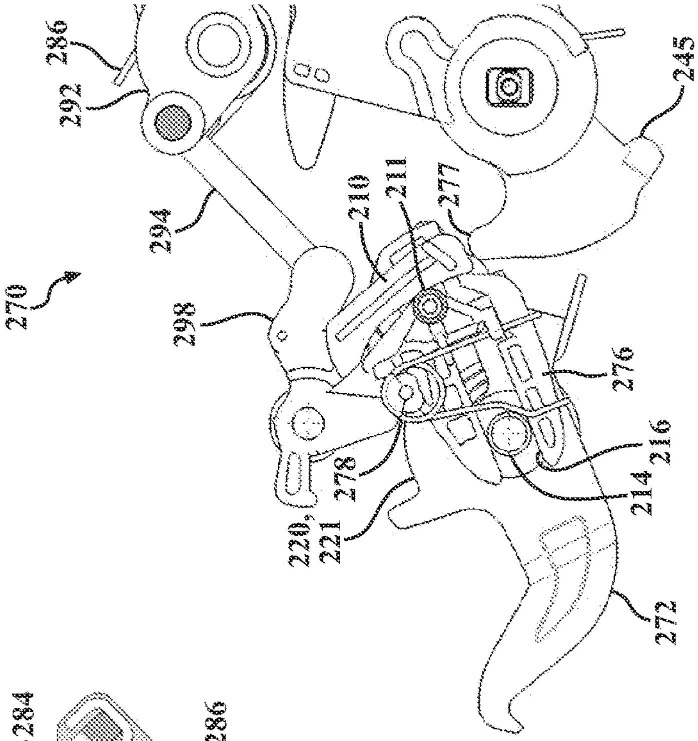
FIG. 23B is fragmentary rear plan view of FIG. 23A.
Figure 23C:
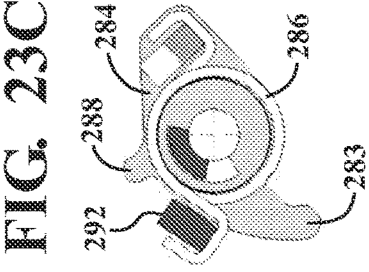
FIG. 23C is a view similar to FIG. 21 of the transmission sector, transmission spring and toggle spring while the power release gear of the actuation mechanism is in the home position, and the actuation mechanism is in the double pull off state and the child lock off state.
Figure 23A:
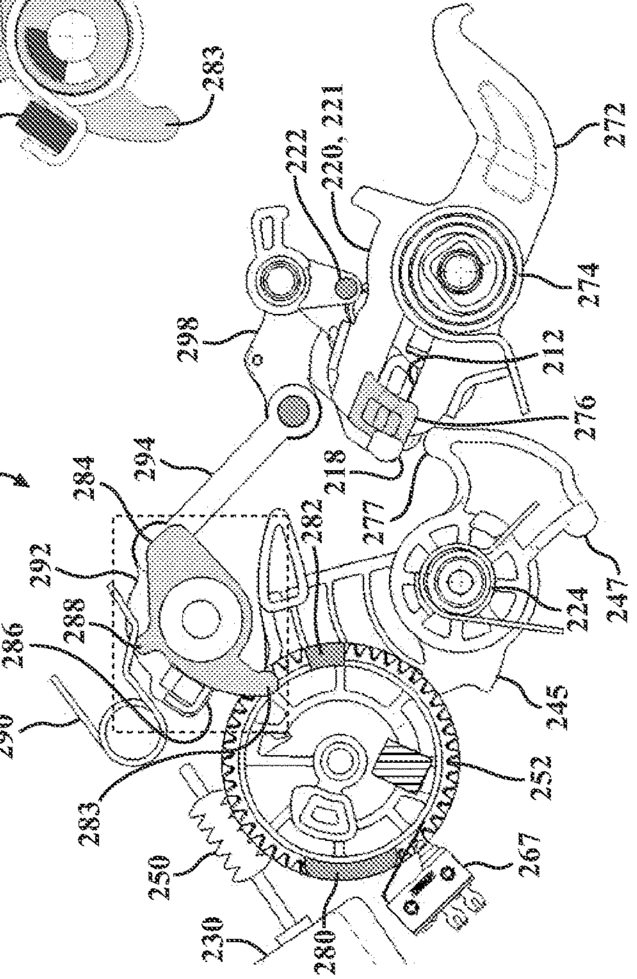
FIG. 23A is a view similar to FIG. 20A illustrating a power release gear of the actuation mechanism of the power latch assembly while in a home position, whereat the actuation mechanism is shown in a double pull off state and a child lock off state.
Figure 24C:
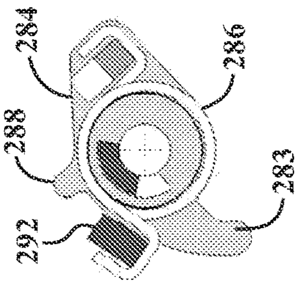
FIG. 24C is a view similar to FIG. 23C of the transmission sector, transmission spring and toggle spring while the power release gear is in the home position, with the actuation mechanism in the double pull off state and the child lock off state.
Figure 24B:
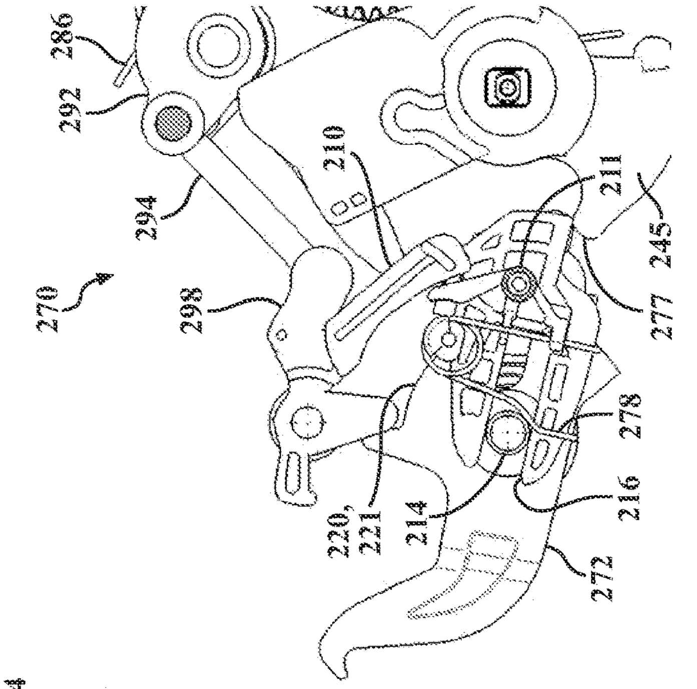
FIG. 24B is fragmentary rear plan view of FIG. 24A.
Figure 24A:
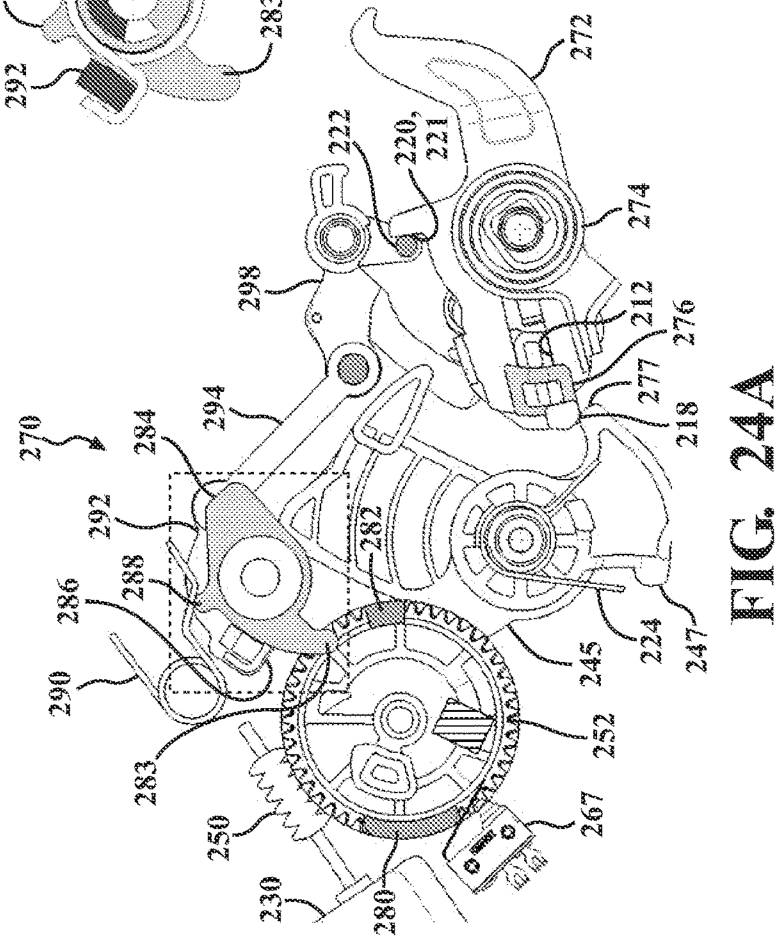
FIG. 24A is a view similar to FIG. 23A illustrating a first pull of an inside release lever of the actuation mechanism while the power release gear is in the in the home position, with the actuation mechanism in the double pull off state and the child lock off state.
Figures 25A, 25B, 25C:
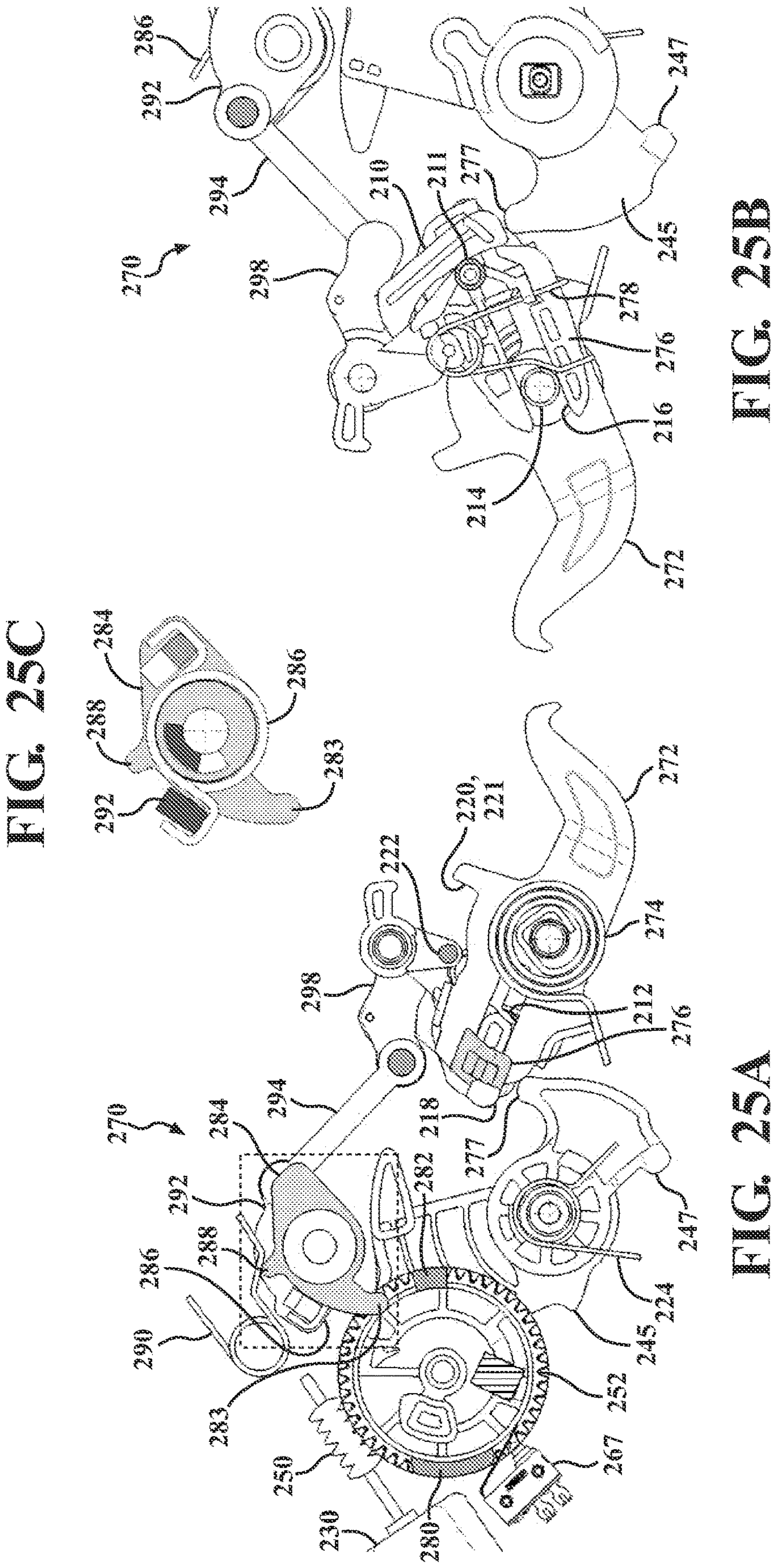
FIG. 25A is a view similar to FIG. 24A after release of the inside release lever of the actuation mechanism upon completing the first pull.
FIG. 25B is fragmentary rear plan view of FIG. 25A.
FIG. 25C is a view similar to FIG. 23C of the transmission sector, transmission spring and toggle spring while the power release gear is in the home position, with the actuation mechanism in the double pull off state and the child lock off state upon completion of the first pull.

In addition to the normal power release performed via selective powered actuation of electric motor 230, discussed above, power release gear 252 can be driven from its home position HP initially in the counterclockwise second direction, as viewed in FIG. 20A, to move an actuation mechanism 270 from a double pull OFF state and a child lock OFF state, to one of a double pull ON state and a child lock ON state, as desired, via selective powered actuation of electric motor 30, as discussed further below.

Actuation mechanism 270, while in its double pull OFF state and child lock OFF state, allows a single actuation of inside release mechanism 224 to move pawl 234 from it ratchet holding position to its ratchet releasing position, as illustrated in FIG. 23A-25B. Selective actuation of actuation mechanism 270 can be effected via inside release mechanism 24. Mechanical actuation (pull) of inside release mechanism 24 (FIGS. 24A and 24B) moves an inside release lever 272, such as pivotably, against a bias imparted by an inside release lever biasing member 274, shown as a coil spring, by way of example and without limitation, from a rest position to a deployed position. Movement of the inside release lever 272 to the deployed position causes an inside lock link 276 to move into engagement with a driven surface 277 of actuator lever 245, whereupon actuator lever 245 is rotatably driven to bring drive surface 247 into driving engagement with pawl lever 236, whereupon pawl 234 is driven to its ratchet releasing position. Inside lock link 276 is biased by an inside lock link biasing member 278, shown as a torsion spring, by way of example and without limitation, to a rest, engaged position, whereat inside lock link 276 is positioned for engagement with driven surface 277 of actuator lever 245 upon actuation of inside release lever 272.

Figure 26B:
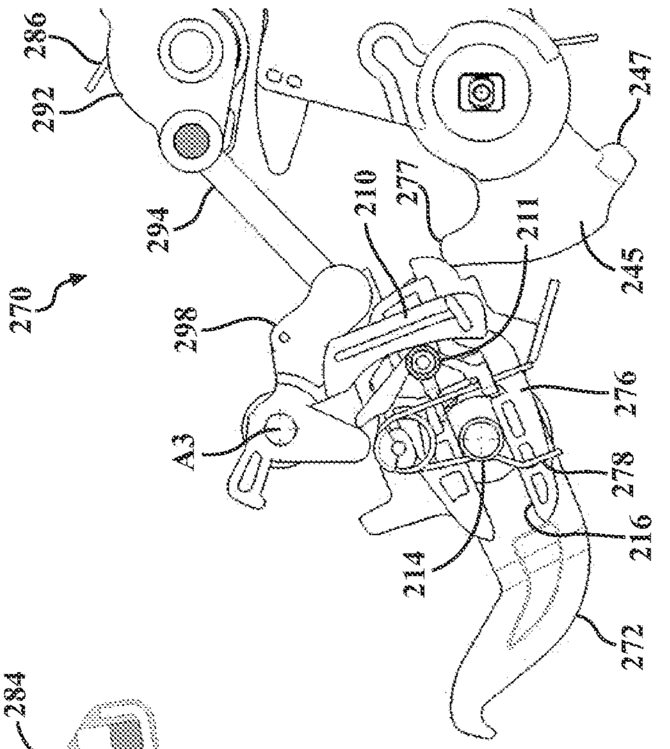
FIG. 26B is fragmentary rear plan view of FIG. 26A.
Figure 26C:
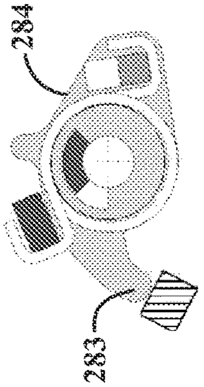
FIG. 26C is a view similar to FIG. 23C of the transmission sector, transmission spring and toggle spring while the power release gear is in the power child lock position, with the actuation mechanism in the double pull off state and the child lock on state.
Figure 26A:
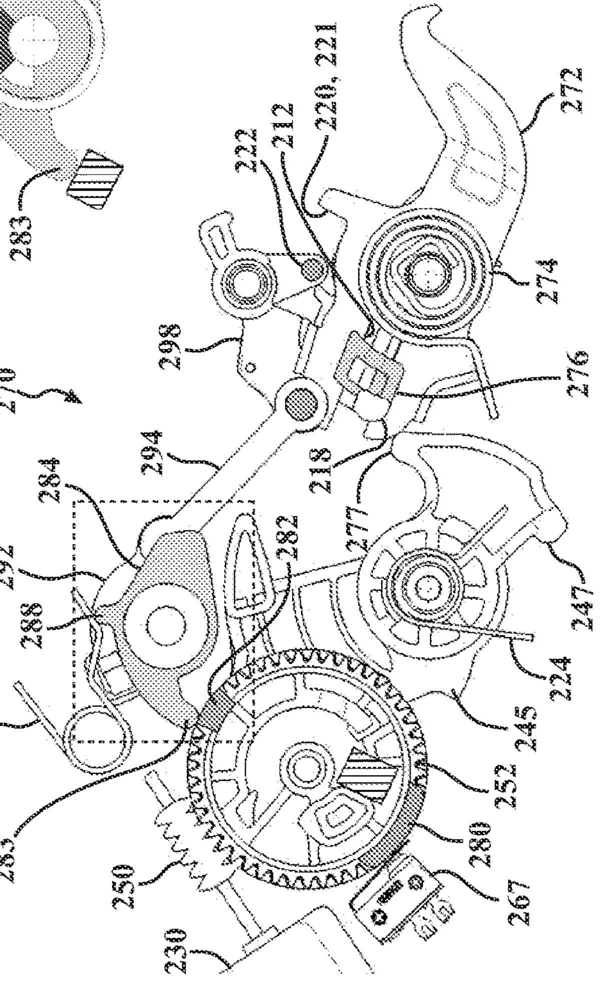
FIG. 26A is a view similar to FIG. 20A illustrating the power release gear of the actuation mechanism of the power latch assembly while moved from the home position to a power child lock position, whereat the actuation mechanism is in a double pull off state and a child lock on state.
Figure 27A:
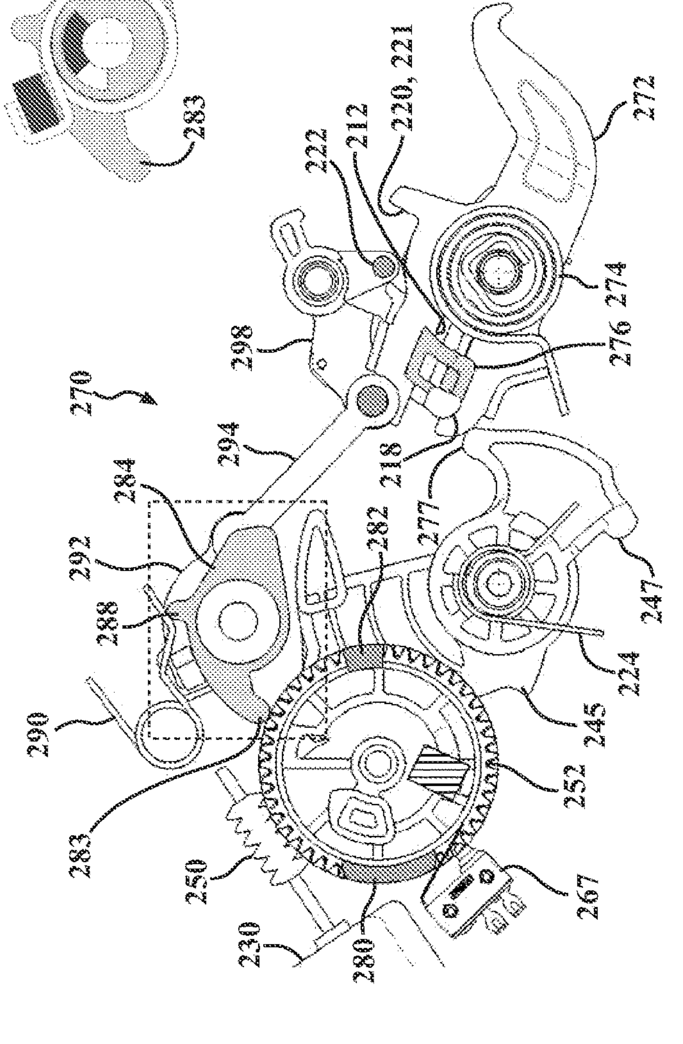
FIG. 27A is a view similar to FIG. 26A illustrating the power release gear of the actuation mechanism of the power latch assembly while moved from the power child lock back to the home position, whereat the actuation mechanism is in a double pull on state and the child lock off state.

When desired to move latch assembly 210 to the double pull ON state, as shown in FIGS. 26A-27B, whereat two successive actuations of inside release lever 272 are required to move pawl 234 to it ratchet releasing position, power release actuator 230 is energized to drive power release gear 252 counterclockwise about axis A from the home position (HP) to the power child lock position (PCL) (FIG. 26A), and then back in the clockwise direction from the power child lock position (PCL) to the home position (HP)(FIG. 27A). Upon driving power release gear 252 counterclockwise from the home position (HP) to a power child lock position (PCL), a position sensor 267 is activated via a sensor lug 280 fixed to power release gear 252, wherein position sensor 267 is configured in electrical communication with ECU 64 to indicate power release gear 252 being in the power child lock position (PCL). At the same time, during rotation of power release gear 252 in the counterclockwise direction, a power child lock lug, also referred to as lock lug 282 is brought into engagement with a driven extension, also referred to as nose 283 of a transmission sector 284, whereupon transmission sector 284 is rotatably driven about an axis A1 from its home position to a deployed position. As transmission sector 284 is rotated from the home position, a radially outwardly extending protrusion, also referred to detent 288, of transmission sector 284 is moved against a bias of a biasing member, shown as a torsion spring, and referred to hereafter as toggle spring 290. Toggle spring 290 acts to releasably hold transmission sector 284 in its home position until the force imparted by toggle spring 290 is overcome under the driven force applied by lug 282 on nose 283 until transmission sector 284 reaches it deployed position, whereat toggle spring 290 releasably holds transmission sector 284 in its deployed position. With transmission sector 284 in its deployed position, lock lug 282 is radially aligned in confronting relation with nose 283, such that transmission sector 284 is temporarily blocked from returning to its home position by lock lug 82. With transmission sector 284 blocked from returning to its home position, as discussed above for transmission sector 84 and lock lug 82, latch assembly 210 is temporarily positioned in its child lock ON state (FIG. 26A). Then, with ECU 64 detecting power release gear 252 having reached the power child lock position (PCL), ECU 64 commands power release actuator 230 to be energized to return power release gear 252 from the power child lock position (PCL) to its home position (HP) (FIG. 27A), whereupon lock lug 282 is moved out from blocking engagement with nose 283, whereupon latch assembly 210 is changed from the child lock ON state to the child lock OFF state and to the double pull ON state.

To complete transition of latch assembly 210 to the double pull ON state, as transmission sector 284 is moved from its home position to its deployed position, a transmission sector biasing member, shown as a transmission coil spring 286, imparts a bias on a power child lock sector, referred to hereafter as child lock sector 292 to pivot child lock sector 292 about a common axis A1 with transmission sector 284. Child lock sector 292 is pivotably coupled to a power child lock link, referred to hereafter as lock link 294, which in turn is pivotably coupled directly to an inside lock lever 298. As such, unlike actuation mechanism 70, actuation mechanism 270 does not have an inside lock sector, nor a double pull lever. Inside lock lever 98 is configured for pivotal movement about an axis A3. As lock link 294 is driven by child lock sector 292, inside lock lever 298 is driven rotatably in a counterclockwise direction about axis A3 (as viewed in FIG. 26B), whereupon a drive arm 210 of inside lock lever 298 engages a driven surface, also referred to as lug 211, of inside lock link 276 to move inside lock link 276 against the bias imparted by inside lock link biasing member 278. As inside lock link 276 is moved against the bias imparted by inside lock link biasing member 278, inside lock link 276 translates within a slot 212 of inside release lever 272, with a pin 214 extending from inside release lever 272 being guided along a slot 216 of inside lock link 276, thereby moving a drive lug 218 of inside lock link 276 out from possible engagement with driven surface 277 of actuator lever 245.

Figure 27B:
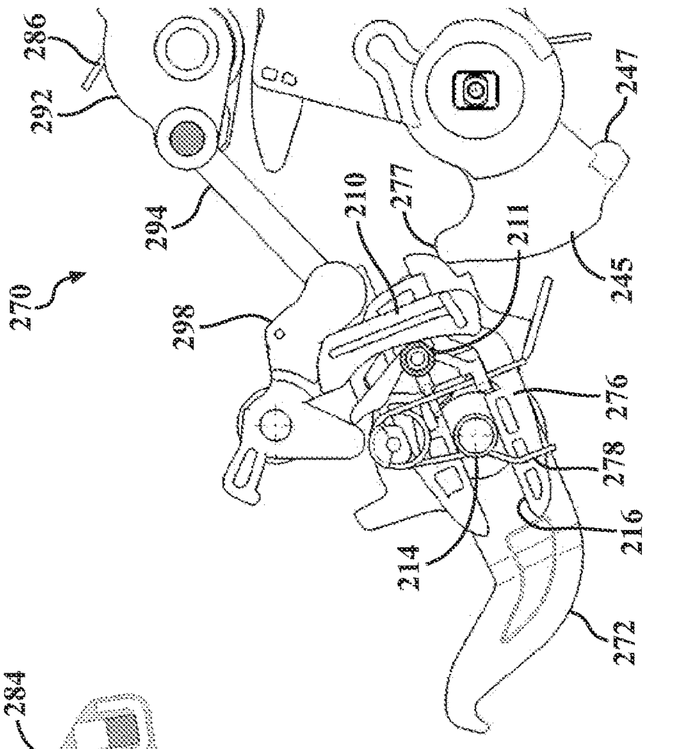
FIG. 27B is fragmentary rear plan view of FIG. 27A.
Figure 27C:
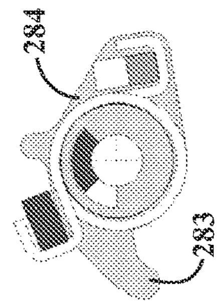
FIG. 27C is a view similar to FIG. 23C of the transmission sector, transmission spring and toggle spring while the power release gear is in the home position, with the actuation mechanism in the double pull on state and the child lock off state.
Figure 28B:
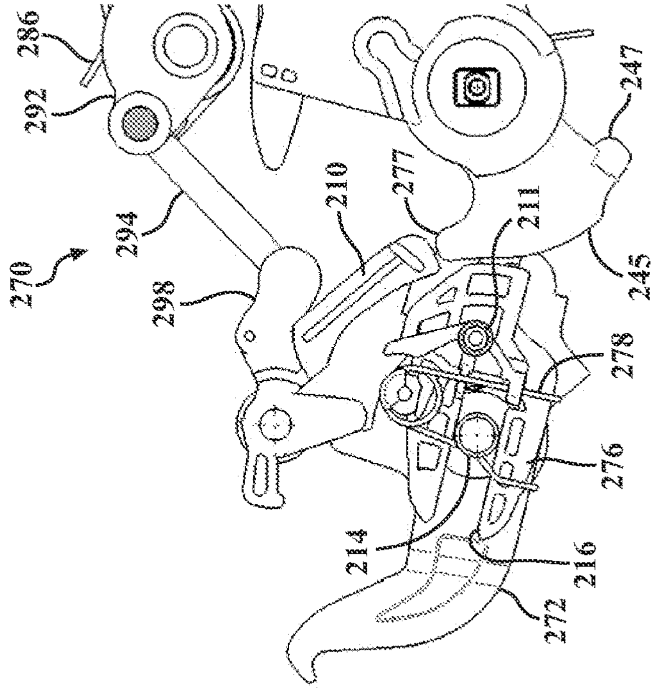
FIG. 28B is fragmentary rear plan view of FIG. 28A.
Figure 28C:
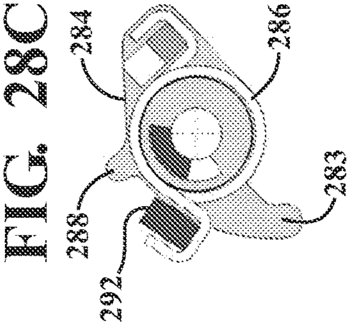
FIG. 28C is a view similar to FIG. 23C of the transmission sector, transmission spring and toggle spring while the power release gear is in the home position, with the actuation mechanism in the double pull off state and the child lock off state.
Figure 28A:
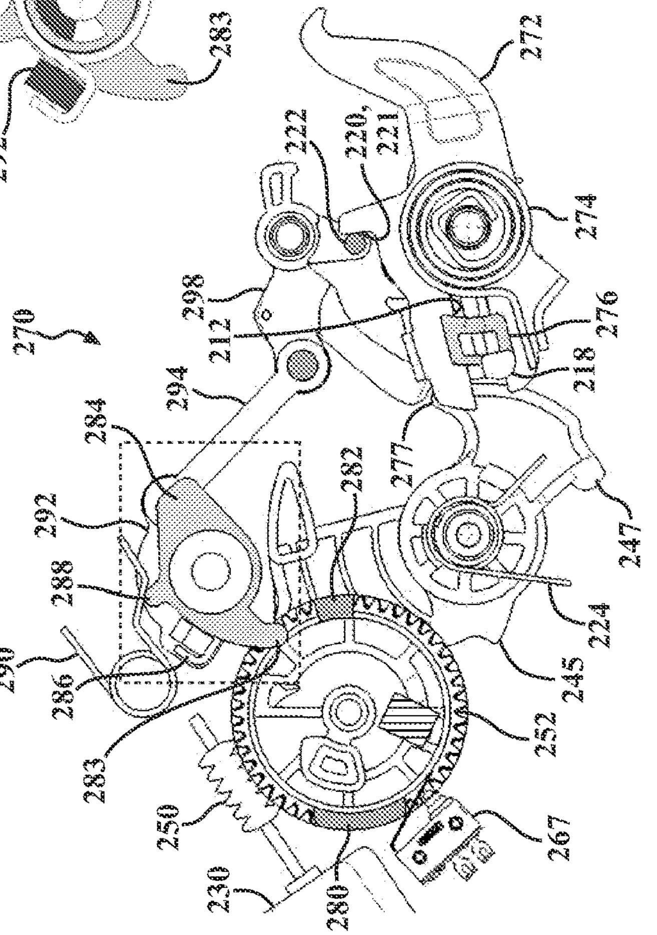
FIG. 28A is a view similar to FIG. 27A illustrating a first pull of the inside release lever of the actuation mechanism while the power release gear is in the in the home position, whereupon the actuation mechanism moves from the double pull on state and child lock off state back to the double pull off state and child lock off state.
Figure 29B:
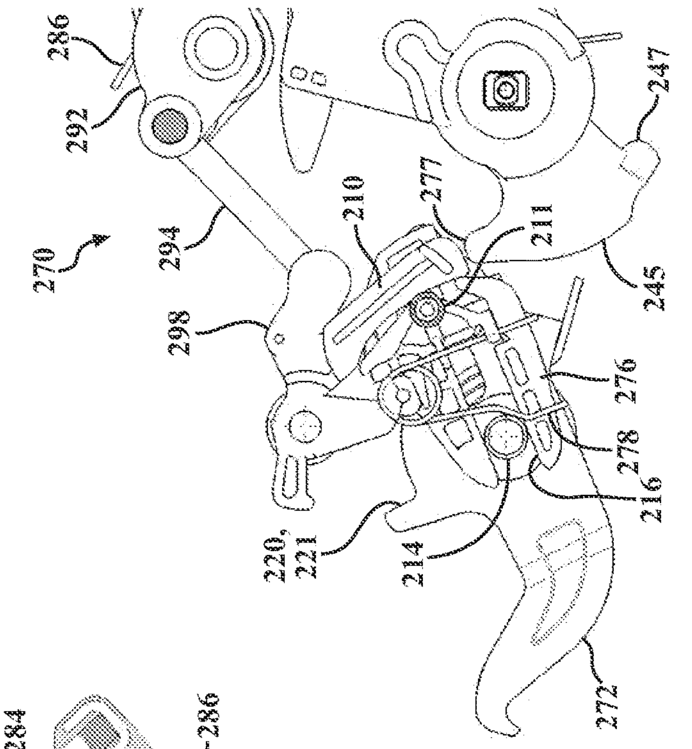
FIG. 29B is fragmentary rear plan view of FIG. 29A.
Figure 29C:
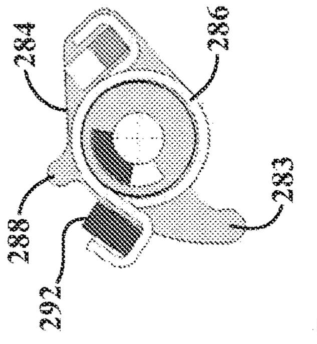
FIG. 29C is a view similar to FIG. 23C of the transmission sector, transmission spring and toggle spring while the power release gear is in the home position, with the actuation mechanism in the double pull off state and the child lock off state upon completion of the first pull.
Figure 29A:
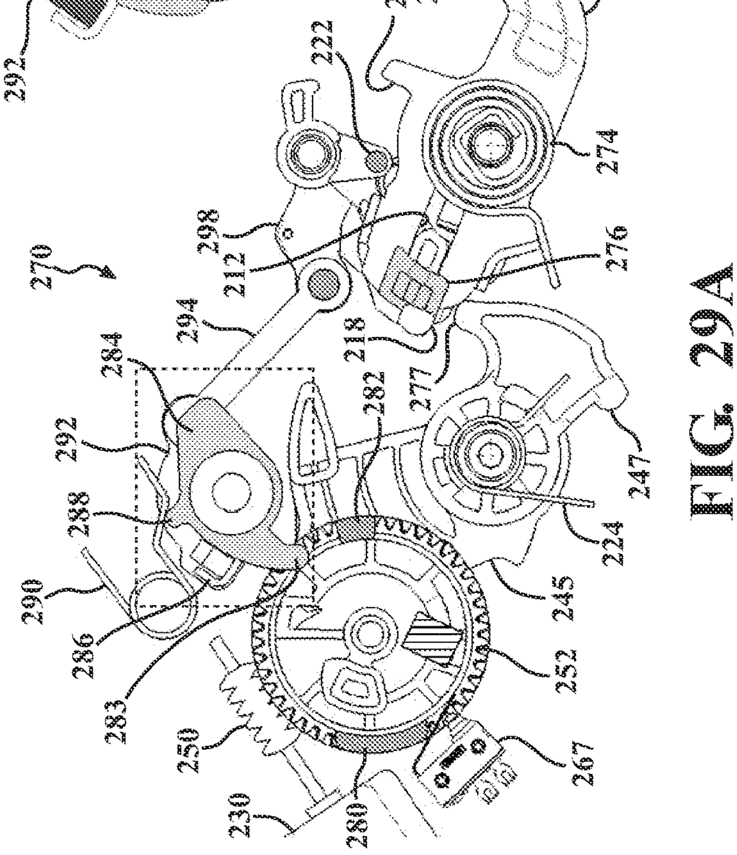
FIG. 29A is a view similar to FIG. 28A after release of the inside release lever of the actuation mechanism upon completing the first pull.
Figure 30B:
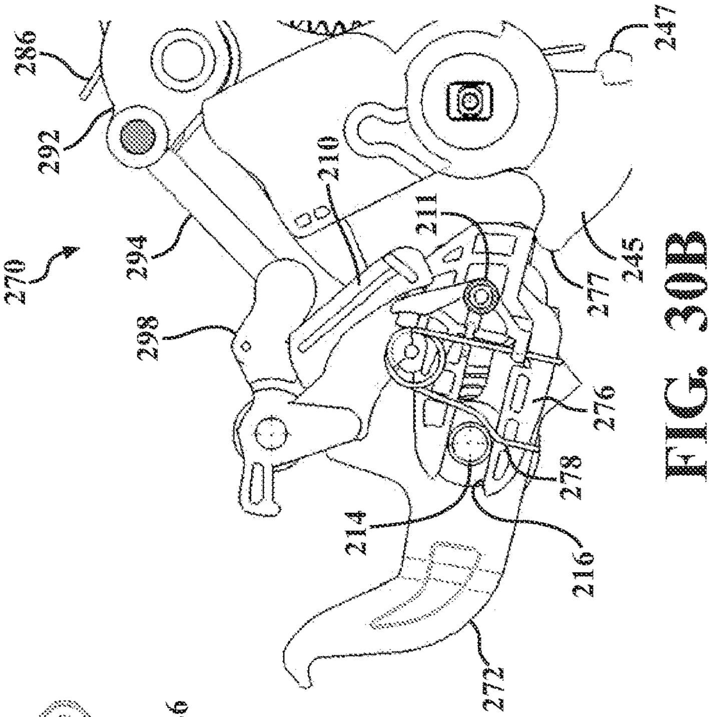
FIG. 30B is fragmentary rear plan view of FIG. 30A.
Figure 30C:
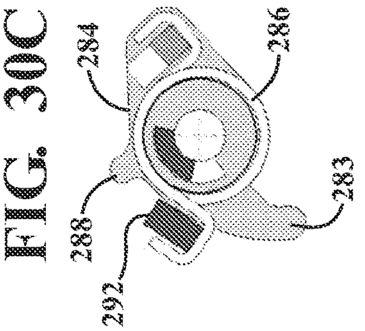
FIG. 30C is a view similar to FIG. 23C of the transmission sector, transmission spring and toggle spring while the power release gear is in the home position, with the actuation mechanism in the double pull off state and the child lock off state.
Figure 30A:
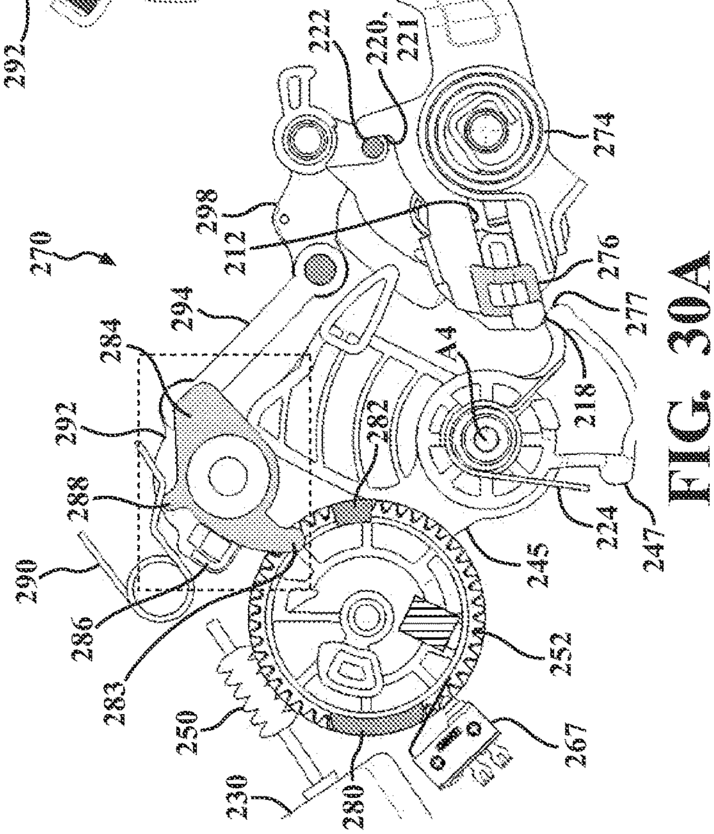
FIG. 30A is a view similar to FIG. 29A illustrating a second pull of the inside release lever of the actuation mechanism while the power release gear is in the in the home position, with the actuation mechanism in the double pull off state and the child lock off state.
Figure 31B:
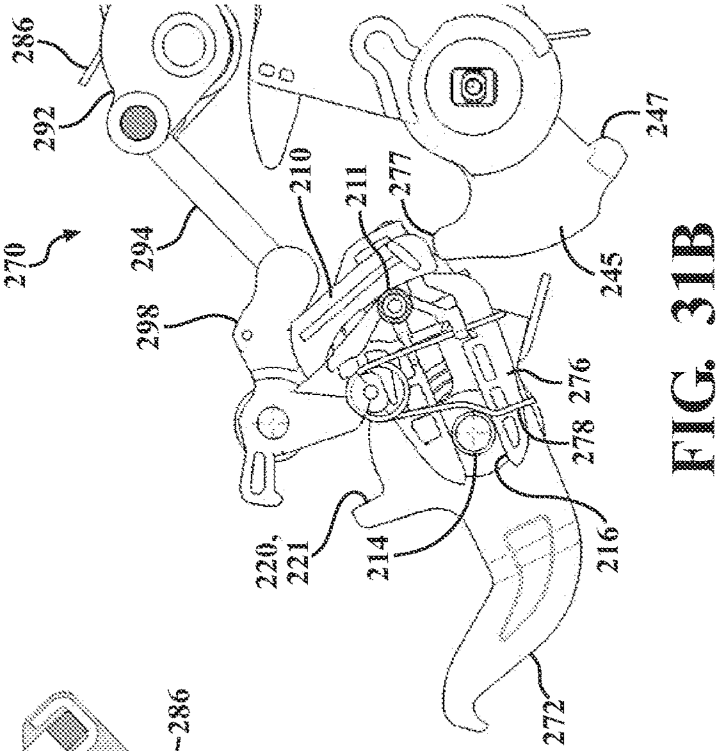
FIG. 31B is fragmentary rear plan view of FIG. 31A.
Figure 31C:
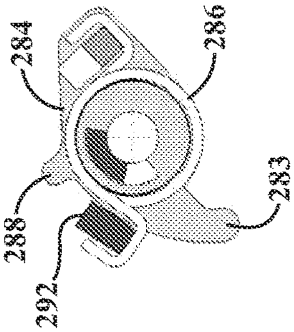
FIG. 31C is a view similar to FIG. 23C of the transmission sector, transmission spring and toggle spring while the power release gear is in the home position, with the actuation mechanism in the double pull off state and the child lock off state upon completion of the second pull.
Figure 31A:
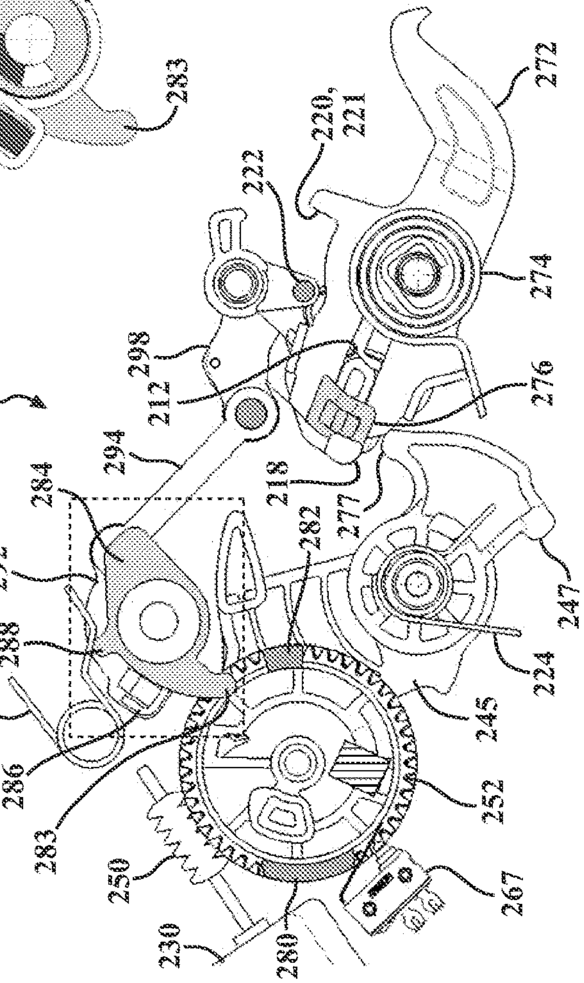
FIG. 31A is a view similar to FIG. 30A after release of the inside release lever of the actuation mechanism upon completing the second pull.
Figure 32A:
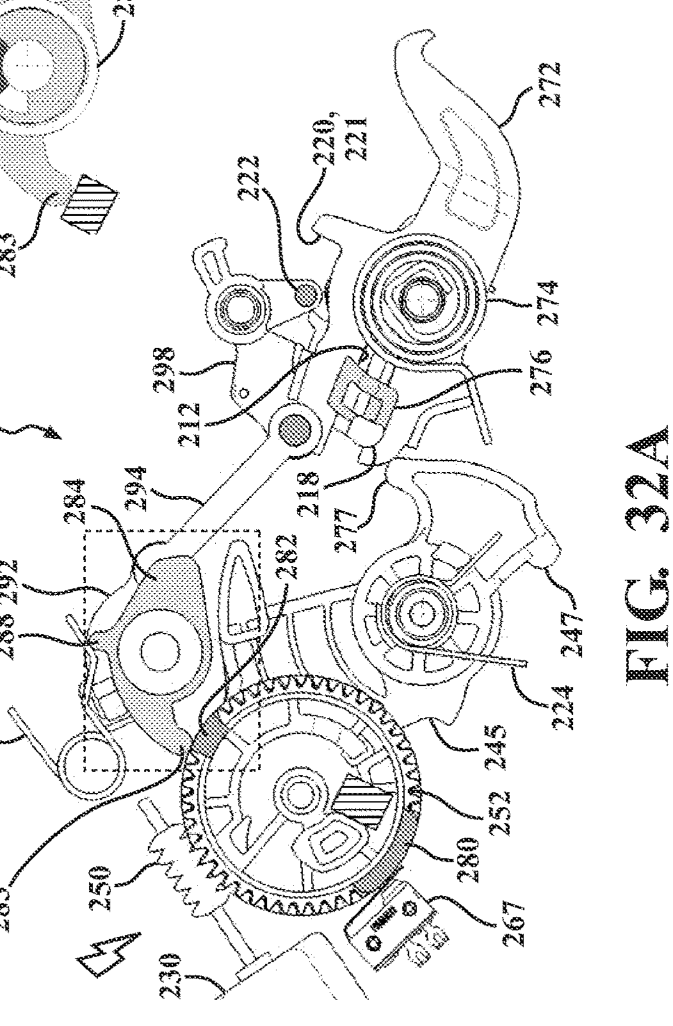
FIG. 32A is a view similar to FIG. 26A illustrating the power release gear of the actuation mechanism of the power latch assembly while moved from the home position to a power child lock position, whereat the actuation mechanism is in the double pull off state and the child lock on state.
Figure 32B:
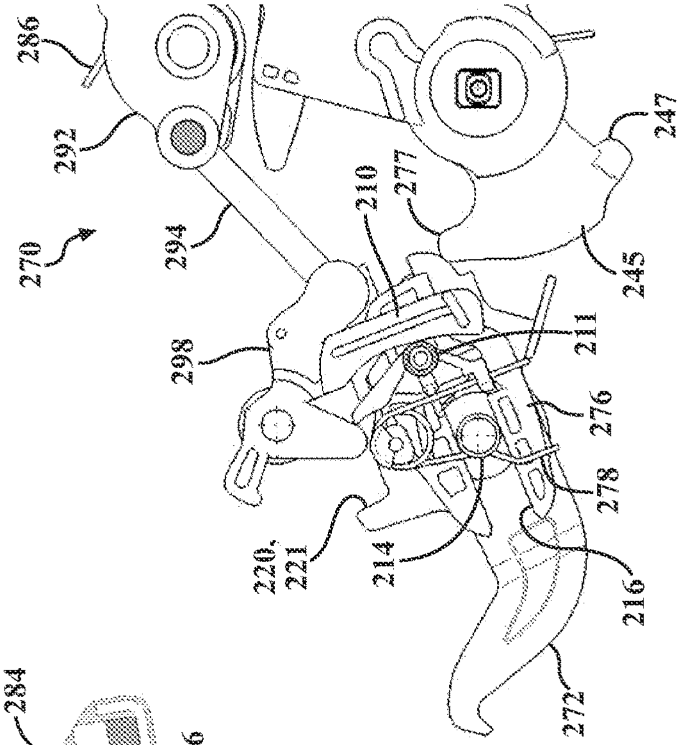
FIG. 32B is fragmentary rear plan view of FIG. 32A.
Figure 32C:
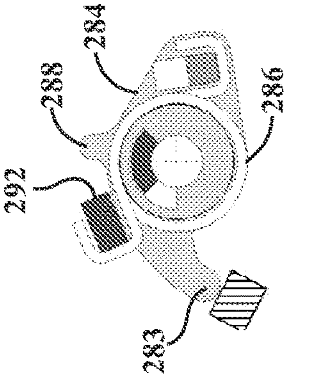
FIG. 32C is a view similar to FIG. 26C of the transmission sector, transmission spring and toggle spring while the power release gear is in the power child lock position, with the actuation mechanism in the double pull off state and the child lock on state.
Figure 33B:
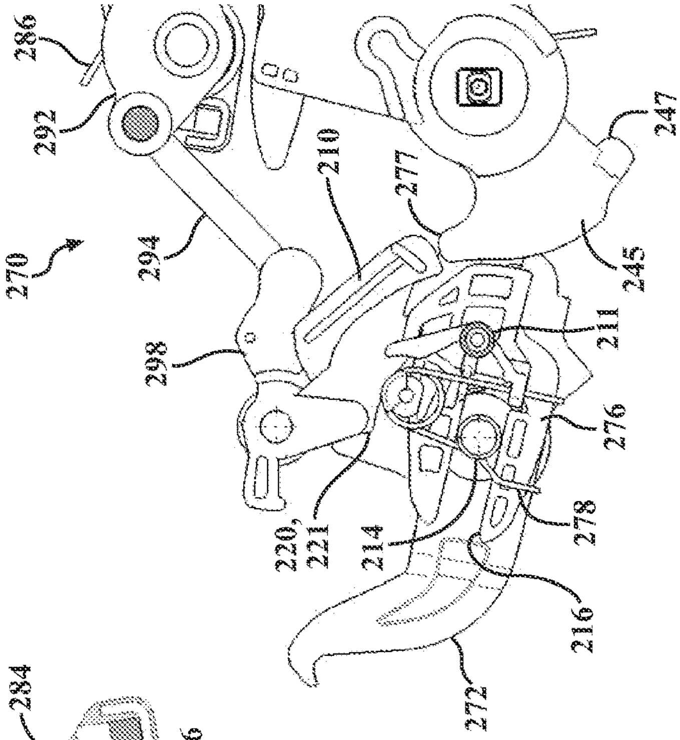
FIG. 33B is fragmentary rear plan view of FIG. 33A.
Figure 33C:
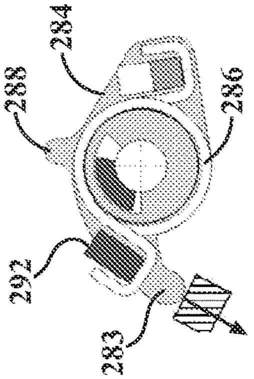
FIG. 33C is a view similar to FIG. 23C of the transmission sector, transmission spring and toggle spring while the power release gear is in the power child lock position, with the actuation mechanism in the double pull off state and the child lock on state.
Figure 33A:
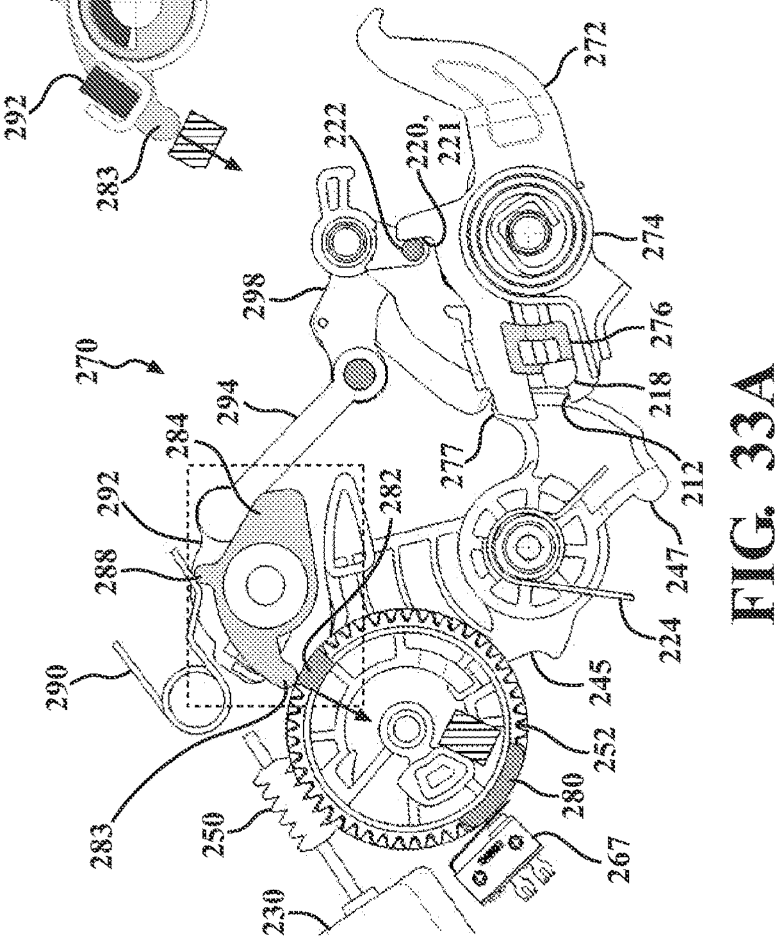
FIG. 33A is a view similar to FIG. 32A illustrating a pull of the inside release lever of the actuation mechanism while the power release gear is in the in the power child lock position, whereupon the actuation mechanism remains in the double pull off state and child lock on state.
Figure 34B:
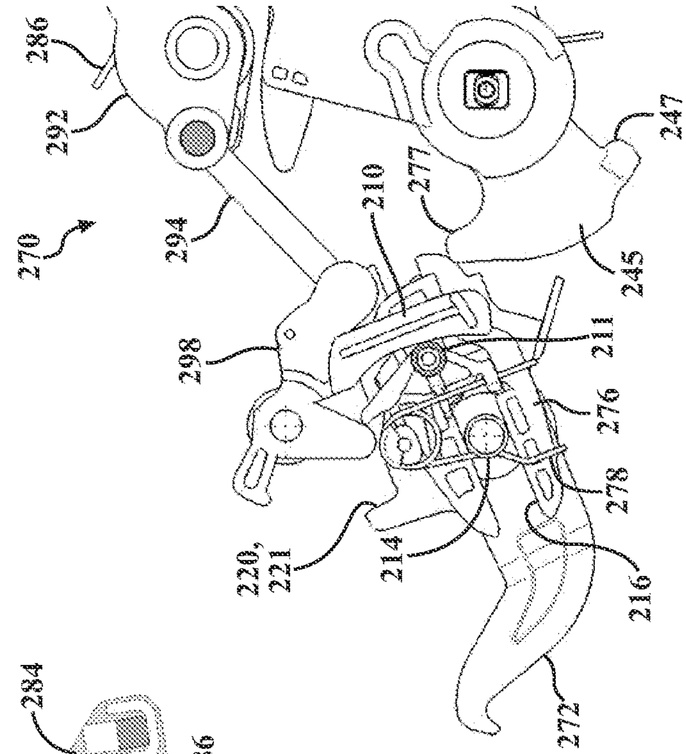
FIG. 34B is fragmentary rear plan view of FIG. 34A.
Figure 34C:
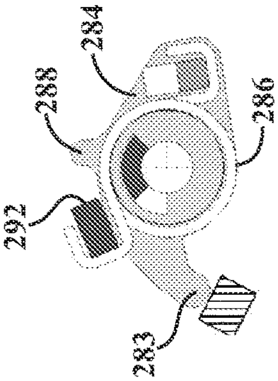
FIG. 34C is a view similar to FIG. 33C of the transmission sector, transmission spring and toggle spring while the power release gear is in the power child lock position, with the actuation mechanism in the double pull off state and the child lock on state upon completion of the pull of the inside release lever.
Figure 34A:
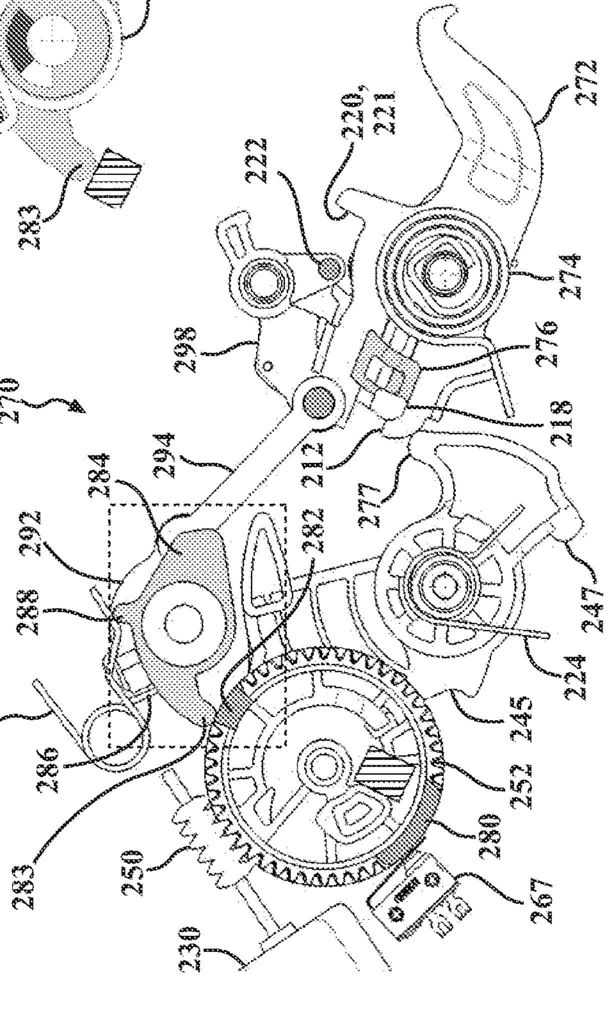
FIG. 34A is a view similar to FIG. 33A after release of the inside release lever of the actuation mechanism upon completing the pull of the inside release lever.
Figure 35B:
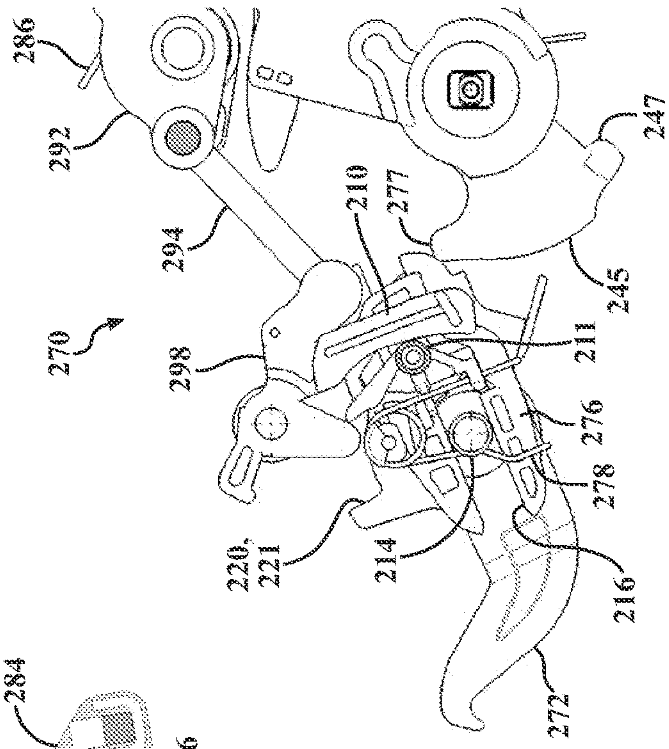
FIG. 35B is fragmentary rear plan view of FIG. 35A.
Figure 35C:
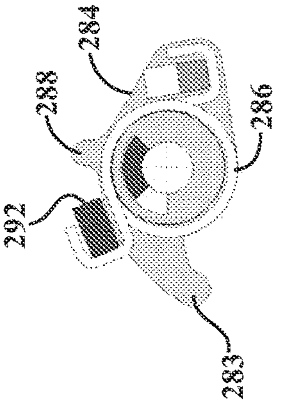
FIG. 35C is a view similar to FIG. 27C of the transmission sector, transmission spring and toggle spring while the power release gear is in the home position, with the actuation mechanism in the double pull on state and the child lock off state.
Figure 35A:
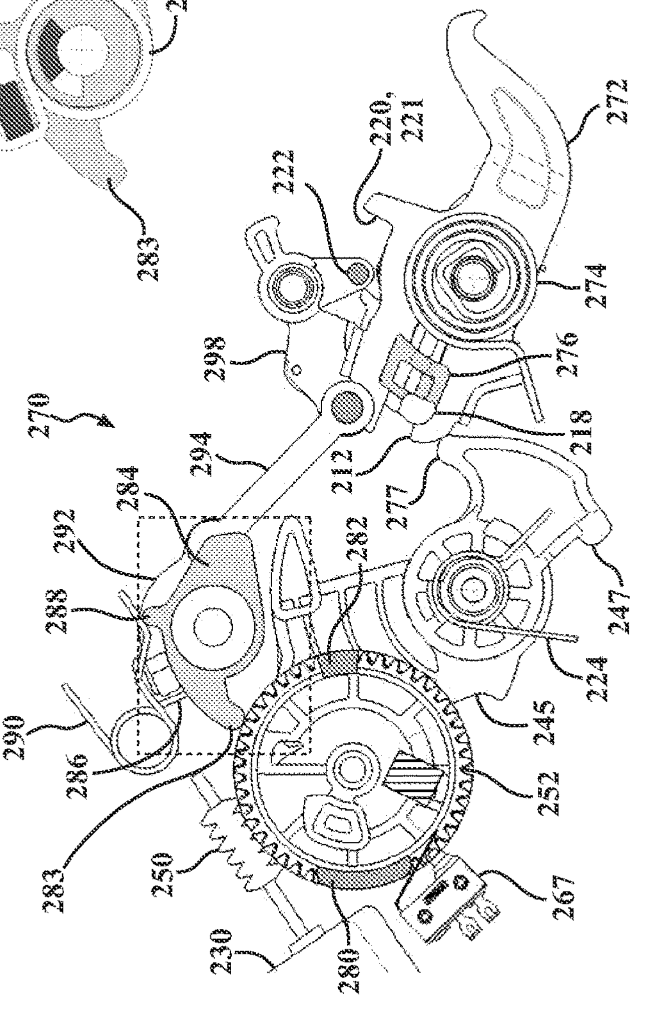
FIG. 35A is a view similar to FIG. 27A illustrating the power release gear of the actuation mechanism of the power latch assembly while moved from the power child lock back to the home position, whereat the actuation mechanism is moved from the child lock on state to the double pull on state, whereat a double pull of the inside release lever causes a power latch assembly to move from a latched state to an unlatched state.

While in the double pull On state (FIGS. 27A and 27B), a first pull of inside release lever 272, as driven by actuation of inside release mechanism 24, causes a drive surface 220, shown as a surface of a slot, also referred to as notch 221, in inside release lever 272, to engage a driven member 222, shown as a pin fixed to inside lock lever 298 and extending into notch 221, thereby causing inside lock lever 298 to be rotated about axis A3 in a counterclockwise direction, as viewed in FIGS. 27B and 28B. As inside lock lever 298 is rotated in response to movement of inside release lever 272, lock link 294 is driven to the left, as viewed in FIG. 28A, thereby causing child lock sector 292 to be driven in a counterclockwise direction, thereby driving transmission sector 284 in a counterclockwise direction to move detent 288 against the bias of toggle spring 290, whereupon nose 283 is brought back into potential engagement with lock lug 282. During the first pull of inside release lever 272, drive lug 218 bypasses driven surface of actuator lever 245, thereby causing pawl 234 to remain in its ratchet holding position, and thus, latch assembly 210' to remain in its latched state. Then, upon release of the first pull force on inside release lever 272, inside release lever 272 returns to it home position (FIGS. 29A and 29B) under the bias of inside release lever biasing member 274, whereupon inside lock link 276 returns to its home position under the bias of inside lock link biasing member 278, whereat drive lug 218 is brought into aligned, confronting relation with driven surface 277 of actuator lever 245. As such, upon completing of the first pull, actuation mechanism 70 is returned to its double pull OFF position and child lock OFF position.

With actuation mechanism 270 returned to its double pull OFF position and child lock OFF position, a second pull of inside release lever 272 (FIGS. 30A and 30B) causes drive lug 218 of inside lock link 276 to engage and drive driven surface 277 of actuator lever 245, thereby rotating actuator lever 245 about an axis A4 against a bias imparted by an actuator lever biasing member 224, shown as a torsion spring, by way of example and without limitation, to cause drive surface 247 of actuator lever 245 to drive pawl lever 236 sufficiently to move pawl 234 from its ratchet holding position to its ratchet releasing position. Accordingly, the second pull of inside release lever 272 via inside release mechanism 24 causes latch assembly 210 to move to its unlatched position, whereupon actuation mechanism 270 remains in its double pull OFF position and child lock OFF position.

When desired to move actuation mechanism 270 to the double pull OFF, child lock ON state, power release actuator 230 is energized to drive power release gear 252 counterclockwise about axis A from the home position (HP) (FIG. 31A) to the power child lock position (PCL) (FIG. 32A), the same as discussed above with regard to FIG. 26A. Power release gear 252 remains in the power child lock position (PCL) as desired, whereat actuation mechanism 270 remains in the child lock ON state. As long as actuation mechanism 270 remains in the child lock ON state, as shown in FIGS. 32A-34B, any number of repeated pulls of inside release lever 272 fails to bring drive lug 218 into engagement with actuator lever 245, and thus, actuator lever 245, pawl release lever 236, pawl 234 and ratchet 232 remain stationary, and actuation mechanism 270 remains in the child lock ON state.

When desired to return actuation mechanism 270 to one of the double pull ON state, the double pull OFF state, and the child lock OFF state, power release gear 252 is moved via actuation of power release actuator 230 clockwise about axis A from the power child lock position (PCL) to the home position (HP) (FIG. 35A), whereat actuation mechanism 270 is moved to the double pull ON state. When in the double pull ON state, a double pull of inside release lever 272 via two pulls of inside release mechanism 24 causes actuation mechanism 270 to be returned to the double pull OFF, child lock OFF state, as discussed above with regard to FIGS. 28A-31B.

Figure 36:
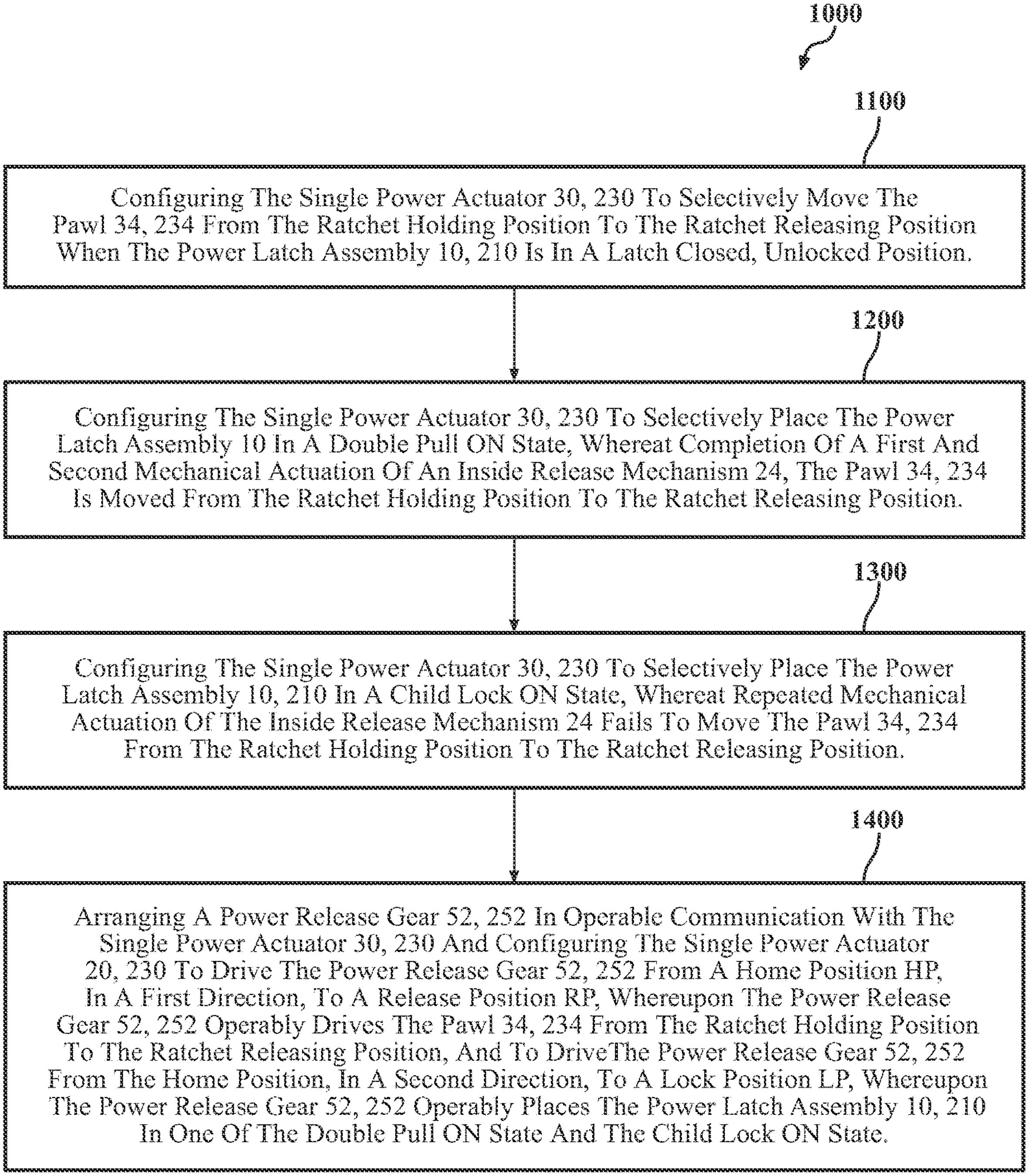
FIG. 36 is a flow diagram illustrating a method of performing multiple functions with a power latch assembly having a single power actuator in accordance with another aspect of the disclosure.

In accordance with another aspect of the disclosure, as shown in FIG. 36, a method 1000 of performing multiple functions with a single power actuator 30, 230 of a power latch assembly 10, 210 having a ratchet 32, 232 configured for movement between a striker capture position and a striker release position, and being biased toward the striker release position, and a pawl 34, 234 configured for movement between a ratchet holding position, whereat the pawl 34, 234 maintains the ratchet 32, 232 in the striker capture position, and a ratchet releasing position, whereat the pawl 34, 234 releases the ratchet 32, 232 for movement of the ratchet 32, 232 to the striker release position, is provided. The method 1000 includes a step 1100 of configuring the single power actuator 30, 230 to selectively move the pawl 34, 234 from the ratchet holding position to the ratchet releasing position when the power latch assembly 10, 210 is in a latch closed, unlocked position. The method 1000 further includes a step 1200 of configuring the single power actuator 30, 230 to selectively place the power latch assembly 10 in a double pull ON state, whereat completion of first and second mechanical actuations of an inside release mechanism 24, the pawl 34, 234 is moved from the ratchet holding position to the ratchet releasing position. The method 1000 further yet includes a step 1300 of configuring the single power actuator 30, 230 to selectively place the power latch assembly 10, 210 in a child lock ON state, whereat repeated mechanical actuation of the inside release mechanism 24 fails to move the pawl 34, 234 from the ratchet holding position to the ratchet releasing position.

In accordance with another aspect, the method 1000 can include a step 1400 of arranging a power release gear 52, 252 in operable communication with the single power actuator 30, 230 and configuring the single power actuator 30, 230 to drive the power release gear 52, 252 from a home position HP, in a first direction, to a release position RP, whereupon the power release gear 52, 252 operably drives the pawl 34, 234 from the ratchet holding position to the ratchet releasing position, and to drive the power release gear 52, 252 from the home position HP, in a second direction, to a lock position LP, whereupon the power release gear 52, 252 operably places the power latch assembly 10, 210 in one of the double pull ON state and the child lock ON state.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power latch assembly for a closure panel, comprising:

a ratchet configured for movement between a striker capture position and a striker release position and being biased toward said striker release position;

a pawl configured for movement between a ratchet holding position, whereat said pawl maintains said ratchet in said striker capture position, and a ratchet releasing position, whereat said pawl releases said ratchet for movement of said ratchet to said striker release position;

a single power actuator configured to move a power release gear to move the pawl from the ratchet holding position to the ratchet releasing position, to move the power release gear to selectively place the power latch assembly in a double pull ON state, whereat a double mechanical actuation of an inside mechanical release mechanism moves the pawl from the ratchet holding position to the ratchet releasing position, and to move the power release gear to a child lock ON position to place the power latch assembly in a child lock ON state, whereat repeated mechanical actuation of the inside mechanical release mechanism does not move the pawl from the ratchet holding position to the ratchet releasing position, wherein the power release gear remains in the child lock ON position while the power latch assembly is in the child lock ON state;

wherein the power release gear is configured in operable communication with the single power actuator, wherein the single power actuator is configured to drive the power release gear from a home position in a first direction to a release position, whereupon the power release gear operably drives the pawl from the ratchet holding position to the ratchet releasing position, and wherein the single power actuator is configured to drive the power release gear from the home position in a second direction to the child lock ON position, whereupon the power release gear operably places the power latch assembly in the child lock ON state;

an actuator lever operably coupling the power release gear to the pawl, whereat movement of the power release gear from the home position in the first direction to the release position causes the power release gear to drive the actuator lever from a rest position to a deployed position, whereat the pawl is driven from the ratchet holding position to the ratchet releasing position;

an inside release lever having an inside lock link coupled thereto for movement relative to said inside release lever between a lock position, whereat said inside lock link is moved out from engagement with said actuator lever during mechanical actuation of the inside mechanical release mechanism, and an unlock position, whereat said inside lock link is moved for engagement with the actuator lever during mechanical actuation of the inside mechanical release mechanism, wherein said inside lock link is prevented from moving from the lock position to the unlock position while the power latch assembly is in the child lock ON state;

a lock link operably coupling the power release gear to the inside lock link to cause movement of the inside lock link from the unlock position to the lock position in response to movement of the power release gear from the home position to the child lock ON position;

an inside lock lever operably coupling the lock link to the inside lock link, the inside lock lever being configured to cause movement of the inside lock link from the unlock position to the lock position in response to movement of the power release gear from the home position to the child lock ON position; and wherein the inside lock lever is coupled directly to the lock link, and wherein the inside lock lever is configured for direct engagement with the inside release lever and with the inside lock link.

2. The power latch assembly of claim 1, wherein the single power actuator is configured to drive the power release gear in the first direction from the child lock ON position back to the home position, whereupon the power release gear operably places the power latch assembly in the double pull ON state.

3. The power latch assembly of claim 1, further including a lock lug fixed to the power release gear, the lock lug being configured to prevent movement of the lock link while the power latch assembly is in the child lock ON state, thereby preventing movement of the inside lock link from the lock position to the unlock position.

4. The power latch assembly of claim 3, further including a transmission sector operably coupling the power release gear to the lock link, the transmission sector being configured to move from a home position to a deployed position under a force imparted by the lock lug as the power release gear moves from the home position to the child lock ON position, whereupon the lock link is moved to cause the inside lock link to move from the unlock position to the lock position.

5. The power latch assembly of claim 4, further including a toggle spring configured for engagement with a detent of the transmission sector to releasably hold the transmission sector in a select one of the home position and the deployed position.

6. The power latch assembly of claim 4, wherein the transmission sector is blocked from moving from the deployed position to the home position by the lock lug when the power release gear is in the child lock ON position, thereby maintaining the power latch assembly in the child lock ON state.

* * * * *